United States Patent
Kadota

(10) Patent No.: US 8,867,063 B2
(45) Date of Patent: Oct. 21, 2014

(54) INFORMATION PROCESSING DEVICE, METHOD AND RECORD MEDIUM FOR IMPLEMENTING STATUS MONITOR

(75) Inventor: Masatoshi Kadota, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 967 days.

(21) Appl. No.: 11/965,954

(22) Filed: Dec. 28, 2007

(65) Prior Publication Data

US 2008/0158596 A1   Jul. 3, 2008

(30) Foreign Application Priority Data

Dec. 28, 2006  (JP) .................................. 2006-354659

(51) Int. Cl.
*G06F 15/00*  (2006.01)
*G06F 3/12*  (2006.01)
*G06K 1/00*  (2006.01)
*G06F 1/32*  (2006.01)
*G03G 15/00*  (2006.01)

(52) U.S. Cl.
CPC ............ *G06F 1/3203* (2013.01); *G06F 3/1294* (2013.01); *G03G 15/5004* (2013.01)
USPC ......................................... 358/1.15; 358/1.13

(58) Field of Classification Search
CPC .. G06F 3/1294; G06F 1/3203; G03G 15/5004
USPC ................................. 358/1.15, 1.13, 1.1, 1.14
See application file for complete search history.

(56) References Cited

U.S. PATENT DOCUMENTS

| | | | |
|---|---|---|---|
| 6,196,735 | B1 | 3/2001 | Inamine |
| 7,474,431 | B2 * | 1/2009 | Yamano et al. .............. 358/1.15 |
| 2004/0051895 | A1 * | 3/2004 | Aizawa ........................ 358/1.13 |
| 2005/0021728 | A1 * | 1/2005 | Sugimoto ..................... 709/223 |
| 2006/0087993 | A1 * | 4/2006 | Sengupta et al. ............. 370/310 |
| 2006/0125867 | A1 | 6/2006 | Sakuda et al. |
| 2006/0187480 | A1 * | 8/2006 | Tsuchiya et al. ............. 358/1.13 |

FOREIGN PATENT DOCUMENTS

| | | | |
|---|---|---|---|
| JP | 9305350 | A | 11/1997 |
| JP | 11015606 | A | 1/1999 |
| JP | 2000148416 | A | 5/2000 |
| JP | 2001-047706 | A | 2/2001 |

(Continued)

OTHER PUBLICATIONS

Notification of Reasons for Rejection for Japanese for patent application No. 2006-354659 mailed May 10, 2011.

(Continued)

*Primary Examiner* — Douglas Tran
(74) *Attorney, Agent, or Firm* — Banner & Witcoff, Ltd.

(57) ABSTRACT

An information processing device, configured to be capable of shifting from a first state (normal operating state) to a second state (power-saving state) and returning from the second state to the first state, comprises: a first detection unit which detects the return of the information processing device from the second state to the first state; a first transmission unit which transmits a start signal (for requesting an image formation device to start supplying status information indicating status of the image formation device) to the image formation device when the return to the first state is detected by the first detection unit; an acquisition unit which acquires the status information from the image formation device receiving the start signal; and a monitor processing unit which executes processing for monitoring the status of the image formation device on a display unit based on the status information acquired by the acquisition unit.

19 Claims, 13 Drawing Sheets

(56) References Cited

FOREIGN PATENT DOCUMENTS

| | | |
|---|---|---|
| JP | 2002237819 A | 8/2002 |
| JP | 2006-215686 | 8/2006 |
| JP | 2006-260187 | 9/2006 |
| WO | 2004009362 A1 | 1/2004 |

OTHER PUBLICATIONS

Decision of Rejection dispatched Sep. 13, 2011 in Japanese Application No. 2006-354659 and English translation thereof.

* cited by examiner

INFORMATION PROCESSING DEVICE, METHOD AND RECORD MEDIUM FOR IMPLEMENTING STATUS MONITOR

CROSS-REFERENCE TO RELATED APPLICATION

This application claims priority under 35 U.S.C. §119 from Japanese Patent Application No. 2006-354659 filed on Dec. 28, 2006. The entire subject matter of the application is incorporated herein by reference.

BACKGROUND

1. Technical Field

The present invention relates to an information processing device, a method and a record medium for implementing a status monitor.

2. Related Art

Various techniques for letting a computer receive a printer's status information (indicating the operating status, the "paper out" state, etc. of the printer) from the printer and display the received status information on the computer's display unit have been brought into practical use today. Software having this kind of function is generally called a "status monitor." An example of such a technique is disclosed in Japanese Patent Provisional Publication No. 2006-260187 (hereinafter, referred to as '187 publication).

A well-known printer capable of supplying its status information to a computer is designed to shift to a state for supplying the status information when a start signal (requesting the printer to start supplying the status information) is received from the computer.

In order to acquire the status information from such a printer, the status monitor first carries out the transmission of the start signal and thereafter repeats a status information acquisition process as needed.

Incidentally, among such computers equipped with a status monitor, those having a power management function (called "suspend function" or "hibernation function") have become the mainstream.

A computer having the suspend function is capable of shifting from a normal state (hereinafter also referred to as a "first state") to a power-saving state (hereinafter also referred to as a "second state") which is close to the power-off state while keeping a variety of information on its own status, etc. in the normal operating state in its memory, and returning exactly to the status just before the shift to the power-saving state when necessary.

A computer having the hibernation function is capable of shifting to a power-saving state (second state) which is equivalent to the power-off state after storing a variety of information on its own status, etc. in the normal operating state (first state) in a storage device such as an HDD (Hard Disk Drive), and returning exactly to the status just before the shift to the power-saving state when necessary by reading out the variety of information which has been stored in the storage device.

However, the use of such power-saving functions (suspend function, hibernation function) on a computer that has already activated the status monitor may cause the following problems.

Since the power-saving function is used generally when the user suspends or stops his/her use of the computer, the user is likely to turn OFF the power switch of the printer at the same time. When the user restarts the use of the computer and the printer, the computer is returned from the power-saving state to the normal operating state and the power switch of the printer can be turned ON again by the user.

In such cases, even when the aforementioned "start signal" from an information processing device (e.g. computer) had been received by the printer before its shutdown, the reception of the start signal becomes void since the status of the printer itself is initialized by the turning OFF and ON of the power.

Meanwhile, the computer is incapable of recognizing the change in the status of the printer because the printer was turned OFF and ON during the power-saving state of the computer. Further, since the status monitor operating on the computer returns to a state in which it recognizes that the start signal has already been transmitted to the printer, the status monitor thereafter tries to repeat the status information acquisition process as needed.

Therefore, the printer (recognizing that no start signal has been received) remains in a state in which it does not supply the status information to the computer even though the status information acquisition process is repeated by the computer (recognizing that the start signal has already been transmitted).

In such a state, even when some kind of error occurs to the printer, the computer is incapable of receiving the status information (indicating the error, etc.) from the printer and thus incapable of displaying the status information properly.

SUMMARY OF THE INVENTION

The present invention which has been made in consideration of the above problems is advantageous in that an information processing device, a method and a record medium, implementing a status monitor capable of monitoring appropriate status information even after the information processing device's shift to and return from the power-saving state, can be provided.

In accordance with an aspect of the present invention, there is provided a computer-readable record medium storing computer-readable instructions that cause an information processing device (configured to be capable of shifting from a first state as a normal operating state to a second state as a state for reducing power consumption compared to the first state and returning from the second state to the first state) to function as a status monitor for displaying status of an image formation device on a display unit by causing a computer of the information processing device to function as: a first detection unit which detects the return of the information processing device from the second state to the first state; a first transmission unit which transmits a start signal, for requesting the image formation device to start supplying status information indicating status of the image formation device, to the image formation device when the return to the first state is detected by the first detection unit; an acquisition unit which acquires the status information from the image formation device receiving the start signal; and a display processing unit which displays the status of the image formation device on the display unit based on the status information acquired by the acquisition unit.

By letting the information processing device function as the status monitor according to the computer-readable instructions stored in the computer-readable record medium (e.g. HDD, RAM, ROM, flash memory, EEPROM, CD-medium, DVD-medium, temporary storage, floppy disk, permanent storage, etc.), the start signal is transmitted from the information processing device to the image formation device when the information processing device returns from the second state to the first state.

Therefore, even when the status of the image formation device has been initialized during the second state of the information processing device, the information processing device returning to the first state can successfully restart the process for displaying the status of the image formation device.

In the present invention, the "second state" means a state for reducing power consumption compared to the first state, and thus the so-called "suspend state" and "hibernation state" both correspond to the "second state" in the present invention. While the suspend/hibernation states are sometimes called standby/dormant states, etc., such states of course correspond to the "second state" in the present invention even if the states are named and called differently.

Incidentally, some information processing devices having a power management function of an advanced type are designed to first shift to the suspend state and thereafter shift to the hibernation state (after copying the information which has been held in memory to a storage device such as an HDD) when the voltage of the battery goes below a prescribed voltage. Such a state in which the suspend state and the hibernation state are used together also corresponds to the "second state" in the present invention.

In accordance with another aspect of the present invention, there is provided an information processing device configured to be capable of shifting from a first state as a normal operating state to a second state as a state for reducing power consumption compared to the first state and returning from the second state to the first state, comprising: a first detection unit which detects the return of the information processing device from the second state to the first state; a first transmission unit which transmits a start signal, for requesting an image formation device to start supplying status information indicating status of the image formation device, to the image formation device when the return to the first state is detected by the first detection unit; an acquisition unit which acquires the status information from the image formation device receiving the start signal; and a display processing unit which executes processing for displaying the status of the image formation device on a display unit based on the status information acquired by the acquisition unit.

In accordance with another aspect of the present invention, there is provided a method for an information processing device, configured to be capable of shifting from a first state as a normal operating state to a second state as a state for reducing power consumption compared to the first state and returning from the second state to the first state, to display status of an image formation device on a display unit, comprising: a first detection step of detecting the return of the information processing device from the second state to the first state; a first transmission step of transmitting a start signal, for requesting the image formation device to start supplying status information indicating status of the image formation device, to the image formation device when the return to the first state is detected by the first detection step; an acquisition step of acquiring the status information from the image formation device receiving the start signal; and a display processing step of executing processing for displaying the status of the image formation device on the display unit based on the status information acquired by the acquisition step.

By the information processing device and the method configured as above, effects similar to those of the computer-readable record medium described above can be achieved.

BRIEF DESCRIPTION OF THE ACCOMPANYING DRAWINGS

DETAILED DESCRIPTION OF THE EMBODIMENT

Figure 1A:
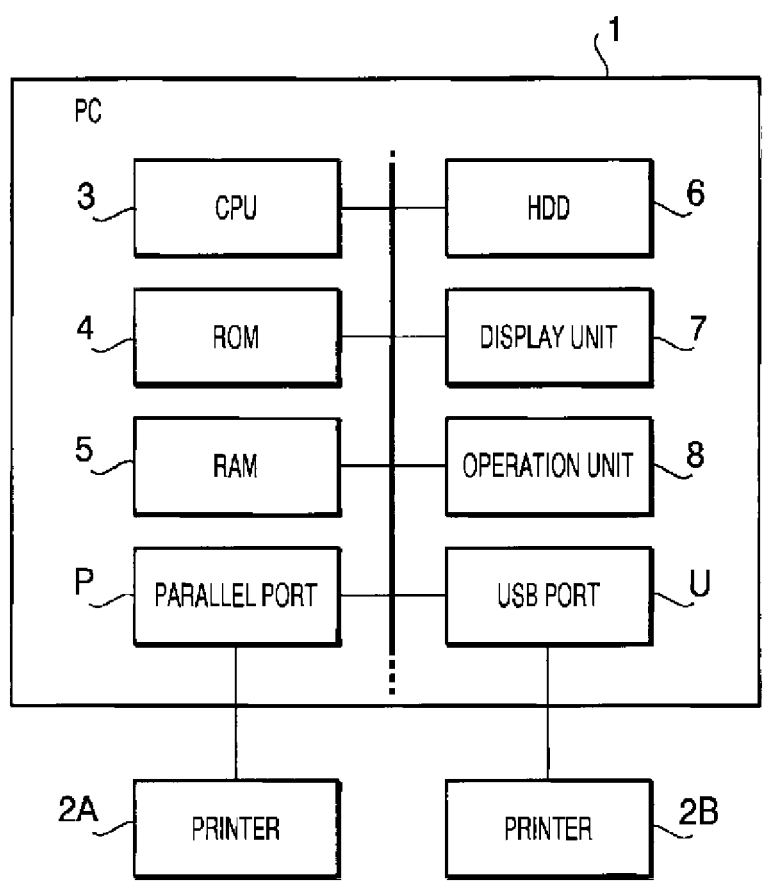
FIG. 1A is a schematic block diagram showing the overall composition of a system including a PC (having a status monitor function in accordance with an embodiment of the present invention) and printers.

Referring now to the drawings, a description will be given in detail of a preferred embodiment in accordance with the present invention.

<Overall Composition of System>

FIG. 1A is a schematic block diagram showing the overall composition of a system including a PC (Personal Computer) 1 (as an information processing device) having a status monitor function in accordance with an embodiment of the present invention and printers 2A and 2B (as image formation devices).

As shown in FIG. 1A, the PC 1 has a hardware configuration similar to that of a well-known personal computer. Specifically, the PC 1 includes a CPU (Central Processing Unit) 3 for performing various computations, a ROM (Read Only Memory) 4 storing a boot program, etc., a RAM (Random Access Memory) 5 to be used as a program area and work areas during program execution by the CPU 3, an HDD (Hard Disk Drive) 6 storing various programs (OS, applications, etc.) to be executed by the CPU 3, user data, etc., a display unit 7 (LCD, etc.) for displaying information, and an operation unit 8 (keyboard, mouse, etc.) for receiving user operations, as its main components. The display unit 7 may either be provided on the main body of the PC 1 or connected to the main body via a cable. The PC 1 is equipped with a parallel port P and at least one USB port U. In this embodiment, two printers 2A and 2B are connected to the parallel port P and the USB port U of the PC 1, respectively.

Figure 1B:
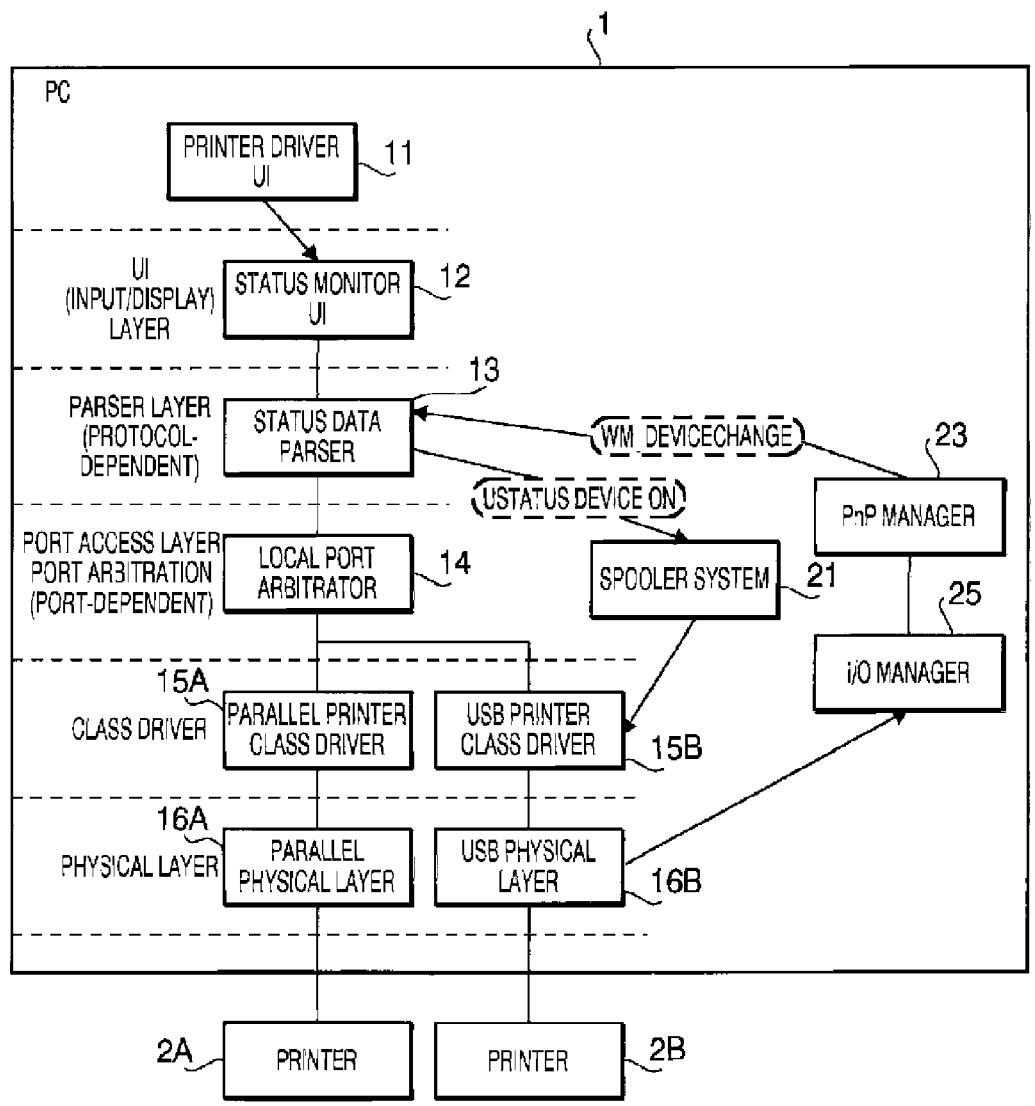
FIG. 1B is a schematic block diagram showing components (hardware, software) of a processing application of the PC related to a process for acquiring status information from the printers.

FIG. 1B is a schematic block diagram showing components (hardware, software) of a processing application of the PC 1 related to a process for acquiring the status information from the printers 2A and 2B.

The PC 1 is equipped with an OS (Operating System) having the multitasking capability, by which multiple processes can be executed in parallel and a variety of processes can be carried out by the cooperation of the processes executed in parallel.

As the OS having the multitasking capability, Windows® can be employed, for example. While the detailed explanation of various functions provided by the OS (well known) is omitted here, the following explanation of this embodiment will be given assuming that the PC 1 is equipped with the various functions provided by Windows®.

In the PC 1, the processing application for executing the status information acquisition process (acquisition of the status information from the printers 2A and 2B) has a hierarchical structure including a UI (input/display) layer, a parser layer, a port access layer, a class driver and a physical layer as shown in FIG. 1B.

Specifically, for the print output to the printer 2A or 2B, a printer driver UI 11 (see FIG. 1B) executes a process related to the printing. In the process, a status monitor UI 12 is activated as a process separate from the printer driver UI 11.

Incidentally, the status monitor UI 12 can be activated by various arbitrarily specified triggers. For example, the status monitor UI 12 may be designed to be activated at the startup of the PC 1 or to be activated by a port monitor for the printing. The status monitor UI 12 may also be designed to be activated by a manual operation by the user.

The status monitor UI 12 is a process for receiving information inputted by the user, displaying the aforementioned status information on the display unit 7, etc. In the process, a status data parser 13 (hereinafter simply referred to as a "parser 13") is activated as a process separate from the status monitor UI 12.

According to the embodiment, the PC 1 is provided with a single parser 13 for a parallel printer class driver 15A and a USB printer class driver 15B (which will be described later). It should be appreciated that the PC 1 may be provided with one parser for each of the parallel printer class driver 15A and the USB printer class driver 15B (i.e., two parsers respectively for the two class drivers).

The parser 13 outputs various commands described in a format in conformity with PJL (Printer Job Language) (hereinafter referred to as "PJL commands") to the printers 2A and 2B. The parser 13 acquires the status information outputted by the printers 2A and 2B receiving a particular PJL command. The PJL is a well-known command language for realizing the control of various functions of printers, which was developed by Hewlett-Packard Co. and thereafter employed by other companies.

The parser 13 further parses (analyzes the syntax of) the acquired status information, converts the status information into a data format that can be referred to by the status monitor UI 12, and outputs the converted status information to the status monitor UI 12.

In the process, the parser 13 dynamically links with a local port arbitrator 14 (hereinafter simply referred to as an "arbitrator 14"), by which the arbitrator 14 shifts to its operating state.

The arbitrator 14 conducts arbitration among different processes that are using the same port and thereby properly controls the data flow so that data to be supplied to a certain process will not be supplied to a different process.

The parallel printer class driver 15A and the USB printer class driver 15B (hereinafter simply referred to as "class drivers 15A and 15B") are drivers as a part of the functions of the OS. Each of these class drivers 15A and 15B is activated at the startup of the PC 1 or at the startup of a device corresponding to itself (15A, 15B).

A parallel physical layer 16A and a USB physical layer 16B are hardware forming the printer ports (parallel port P, USB port U).

Further, the OS installed in the PC 1 includes a spooler system 21, a PnP manager 23, an I/O manager 25, etc.

The spooler system 21 is a well-known system for managing print data outputted by multiple processing applications functioning on the PC 1 (e.g. applications) as print jobs in a centralized manner and outputting the print data successively to the printers 2A and 2B. When a PJL command is outputted by the parser 13, the PJL command is also managed by the spooler system 21 as a print job similarly to other print data.

For example, a PJL command to be sent to the printer 2A is transmitted to the printer 2A via the parallel printer class driver 15A and the parallel physical layer 16A under the control of the spooler system 21. Meanwhile, a PJL command to be sent to the printer 2B is transmitted to the printer 2B via the USB printer class driver 15B and the USB physical layer 16B under the control of the spooler system 21.

In this embodiment, PJL commands such as "USTATUS DEVICE ON", "USTATUS DEVICE OFF" and "INFO STATUS" are transmitted to the printers 2A and 2B via the spooler system 21 in processes which will be described later.

The PJL command "USTATUS DEVICE ON" is a command for instructing a printer (2A, 2B) to start a status information supplying process (process for supplying the status information when the status of the printer has changed). The PJL command "INFO STATUS" is a command for instructing a printer (2A, 2B) to supply the status information at that point in time.

Since a printer (2A, 2B) receiving such a command shifts to a state in which the supply of the status information is possible, the parser 13 can read out (read back) the status information from the printer (2A, 2B) at desired timing.

The PJL command "USTATUS DEVICE OFF" is a command for instructing a printer (2A, 2B) to end the status information supplying process which has been executed by the printer. Each printer (2A, 2B) receiving the PJL command "USTATUS DEVICE OFF" ends the status information supplying process.

In the state in which the status information is supplied from a printer (2A, 2B), the parser 13 converts the status information read out from the printer (2A, 2B) into binary data to be handled by the status monitor UI 12 and outputs the converted status information (binary data) to the status monitor UI 12 in a higher-level layer by interprocess communication.

The PnP manager 23 and the I/O manager 25 have a function of notifying each process about a change in the connection/disconnection of a printer (2A, 2B).

Specifically, when there is a status change in regard to the connection/disconnection of a device (e.g. printer 2A or 2B), the status change is detected by the I/O manager 25 and a message "WM_DEVICECHANGE" is sent to each process by the PnP manager 23 operating in cooperation with the I/O manager 25.

Thus, each process operating on the PC 1 is capable of recognizing a status change in regard to the connection/disconnection of each printer (2A, 2B) based on the notification (message) from the PnP manager 23.

In this embodiment, the parser 13 recognizing a status change in regard to the connection/disconnection of a printer (2A, 2B) executes a process corresponding to the status change. The details of the process will be described later.

<Processes Executed by PC>

In the following, various processes executed by the PC 1 (CPU 3) will be described more specifically with reference to flow charts.

<Printer Driver Installation Process>

Figure 2:
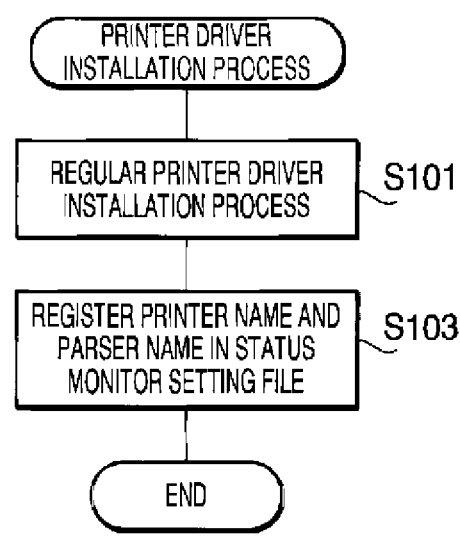
FIG. 2 is a flow chart showing a printer driver installation process executed by the PC.

First, a printer driver installation process which is executed prior to the process for displaying the status information will be explained referring to a flow chart of FIG. 2. The printer driver installation process is a process executed when the user hopes to make a new printer (e.g. 2A or 2B) available from the PC 1.

At the start of the printer driver installation process, the PC 1 (CPU 3) executes a regular printer driver installation process (S101). In the step S101, a series of processes generally executed for the introduction of a printer to this type of PC (e.g. registering the file name of a file containing the printer driver program in a storage area managed by the OS) is executed.

Subsequently, the PC 1 registers a printer name and a parser name in a status monitor setting file (S103) and thereafter ends the printer driver installation process of FIG. 2. The status monitor setting file is a file stored in a storage device (e.g. HDD 6) of the PC 1. In the status monitor setting file, a variety of information necessary for the PC 1 to function as a status monitor is recorded.

In the step S103, the printer name of the printer corresponding to the printer driver being installed and the parser name corresponding to the printer (i.e. the file name of a file containing the parser program) are recorded as a pair. The record will be referred to in order to identify a parser 13 that should be activated based on the printer name in a process (S301) which will be described later.

<Printing Process>

Figure 3:
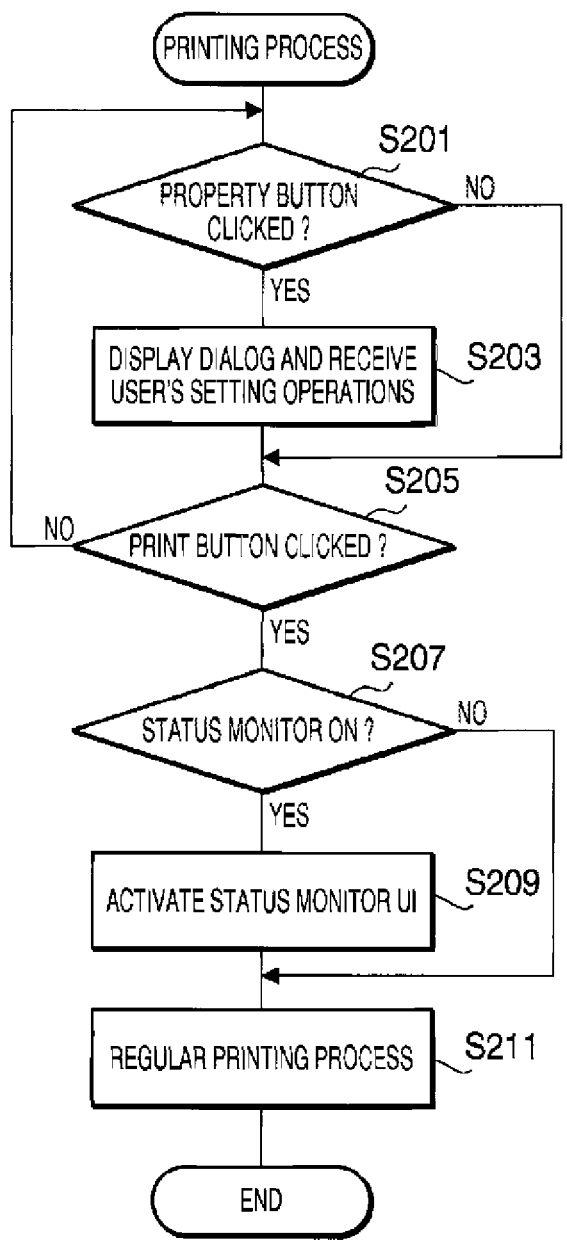
FIG. 3 is a flow chart showing a printing process executed by the PC.

Next, a printing process which is executed by the PC 1 (CPU 3) will be explained referring to a flow chart of FIG. 3. The printing process is executed when a printer driver is activated during the execution of various processes by the PC 1 according to an application program having the printing function.

At the start of the printing process, the PC 1 (CPU 3) displays a print setting window on the display unit 7, and judges whether a property button for executing detailed settings of the printing process is clicked (S201). When the PC 1 judges that the property button is clicked by the user (S201: YES), the PC 1 displays a setting dialog on the display unit 7, receives user operations for making the settings regarding the printer driver, and stores the settings made thorough the setting dialog in a prescribed storage area (S203).

When the PC 1 determines that the property button is not clicked by the user (S201: NO) or when the step S203 has been finished, the PC 1 judges whether a print button in the print setting window is clicked (S205).

When the PC 1 determines that the print button is not clicked at this point (S205: NO), the PC 1 returns to the step S201 to repeat the steps S201-S203 and continue the setting process for a printer.

On the other hand, when the PC determines that the print button is clicked in S205 (S205: YES), the PC 1 judges whether a status monitor ON setting has been made or not (S207).

The status monitor ON setting or a status monitor OFF setting can be made in the aforementioned step S203. When the status monitor ON setting has been made (S207: YES), the PC 1 activates the status monitor UI 12 as a separate process (S209).

When the status monitor ON setting has not been made (S207: NO) or when the step S209 has been finished, the PC 1 executes a regular printing process (S211) and thereafter ends the printing process of FIG. 3.

The regular printing process of S211 is a well-known process such as executing secondary processing for print data which are outputted by the spooler system 21 in the FIFO (First-In First-Out) manner and transmitting the processed print data to a printer (2A, 2B), and thus detailed explanation thereof is omitted here.

<Status Monitor UI Process>

Next, a process of the status monitor UI 12 activated in the aforementioned step S209 in FIG. 3 (hereinafter referred to as a "status monitor UI process") will be explained referring to a flow chart of FIG. 4.

At the start of the status monitor UI process, the status monitor UI 12 reads out the parser name (S301). In this step, the information which has been registered in the status monitor setting file in the step S103 (the correspondence between a printer name and a parser name) is referred to and the parser name corresponding to the printer being targeted by the status monitor UI 12 is read out.

Subsequently, the PC 1 (CPU 3) activates a parser 13 as a separate process based on the parser name obtained in the step S301 (S303). In the activation of the parser 13, the printer name is turned over to the parser 13 in a command line.

Subsequently, the PC 1 judges whether or not the status monitor UI 12 has already been activated in a different process (S305). When the status monitor UI 12 has not been activated yet (S305: NO), a message loop process (S307) is executed. When the status monitor UI 12 has already been activated (S305: YES) or when the message loop process of S307 has been finished, the PC 1 ends the status monitor UI process of FIG. 4.

<Message Loop Process>

Figure 4:
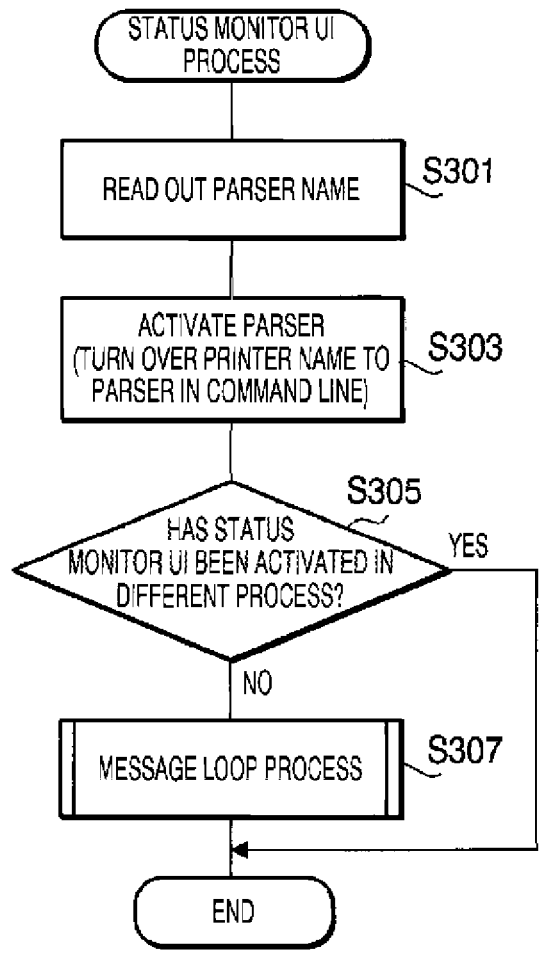
FIG. 4 is a flow chart showing a status monitor UI process executed by the PC (status monitor UI).
Figure 5:
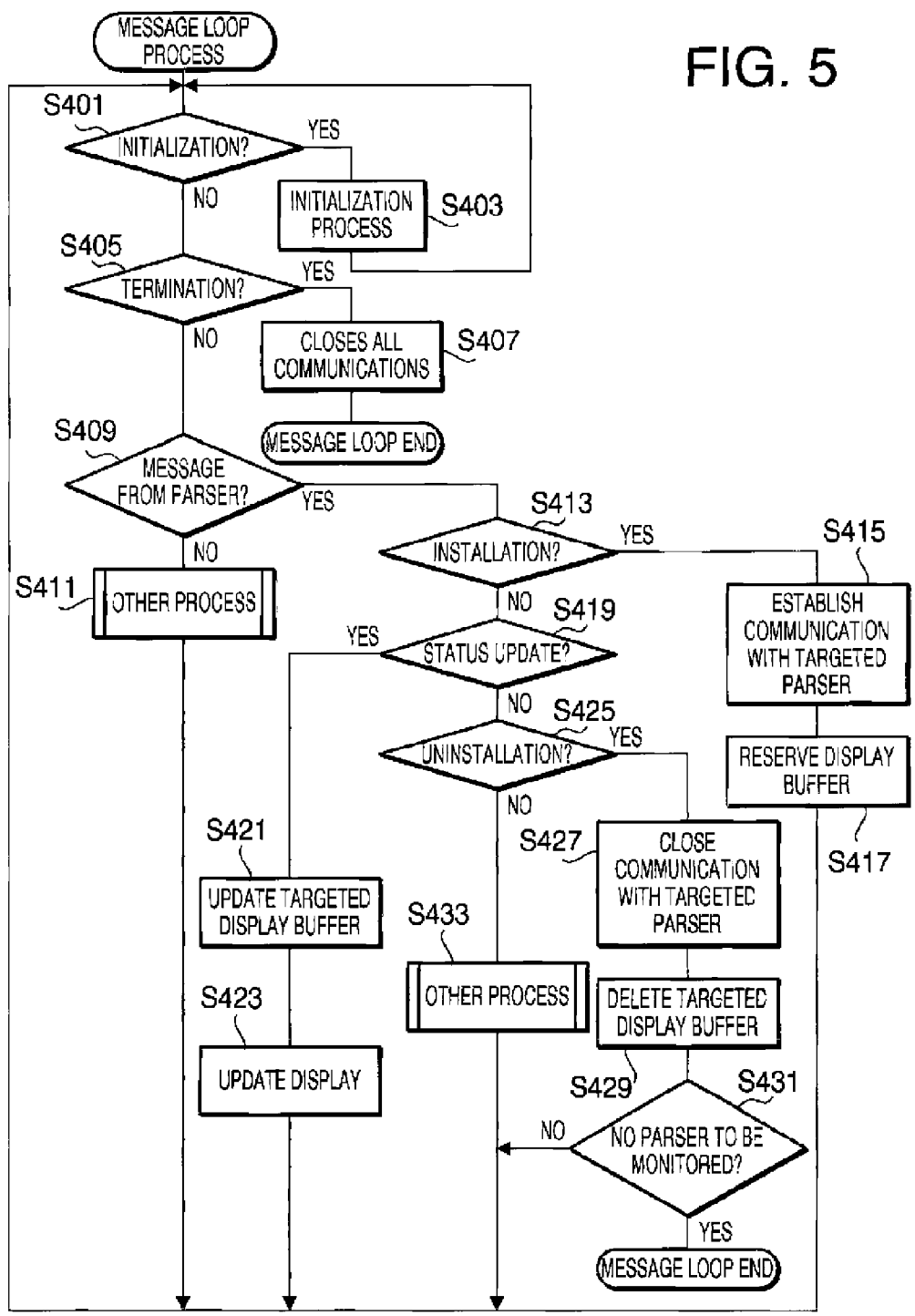
FIG. 5 is a flow chart showing a message loop process (S307 in FIG. 4) executed by the status monitor UI.

FIG. 5 is a flow chart showing the details of the message loop process (S307 in FIG. 4). In the message loop process of FIG. 5, the status monitor UI 12 repeats a task of interpreting an instruction arriving as a message and executing a process corresponding to the arriving instruction (message).

Specifically, the status monitor UI 12 first judges whether the instruction by the arriving message specifies "initialization" or not (S401). When the instruction specifies "initialization" (S401: YES), the status monitor UI 12 executes an initialization process (S403) and thereafter returns to the step S401.

On the other hand, when the instruction by the message does not specify "initialization" (S401: NO), the status monitor UI 12 judges whether the instruction by the message specifies "termination" or not (S405). When the instruction specifies "termination" (S405: YES), the status monitor UI 12 closes all the communications with other processes (S407) and ends the message loop process of FIG. 5.

When the instruction by the message does not specify "termination" (S405: NO), the status monitor UI 12 judges whether the message is from the parser 13 or not (S409). Here, a "message from the parser 13" means a message arriving from a process executed by the parser 13 which has been activated in the step S303.

While the details of the process executed by the parser 13 will be explained later, the status monitor UI 12 in the message loop process of FIG. 5 carries out various processes while executing interprocess communication with the parser 13.

When the message is not from the parser 13 in S409 (S409: NO), the status monitor UI 12 executes a process (other process) corresponding to the message (S411) and thereafter returns to the step S401.

On the other hand, when the message is from the parser 13 (S409: YES), the status monitor UI 12 judges whether the instruction by the message specifies "installation" or not (S413). When the instruction specifies "installation" (S413: YES), the status monitor UI 12 establishes communication with the targeted parser 13 sending the message "installation" (S415).

In the step S415 in this embodiment, interprocess data communication via a shared memory (by attaching the shared memory reserved in a parser process which will be explained later to this process) is employed. However, the concrete method/procedure of the communication with the targeted parser 13 is not particularly limited as long as data can be intercommunicated between processes.

After finishing the step S415, the status monitor UI 12 reserves a display buffer (S417) and thereafter returns to the step S401. The display buffer is a buffer used for outputting the status information to the display unit 7.

On the other hand, when the instruction by the message does not specify "installation" (S413: NO), the status monitor UI 12 judges whether the instruction specifies "status update" or not (S419). When the instruction specifies "status update" (S419: YES), the status monitor UI 12 reads out the status information updated by the parser 13 from the shared memory which has been attached to this process and updates the contents of the targeted display buffer by writing the status information to the display buffer (S421).

The display buffer is the memory area which has been reserved in the step S417. When two or more parsers 13 have been activated, two or more display buffers have already been reserved since the step S417 has been executed for the same number of times as the parsers 13.

Therefore, the status monitor UI 12 in the step S421 identifies the parser 13 sending the message "status update" based on the message and executes the display buffer update (status information update) for the display buffer corresponding to the identified parser 13.

After updating the targeted display buffer, the status monitor UI 12 carries out control for updating the display content on the display unit 7 so as to actually display the updated status information on the display unit 7 (S423). After finishing the step S423, the status monitor UI 12 returns to the step S401.

On the other hand, when the instruction by the message does not specify "status update" (S419: NO), the status monitor UI 12 judges whether the instruction specifies "uninstallation" or not (S425). When the instruction specifies "uninstallation" (S425: YES), the status monitor UI 12 closes the communication with the targeted parser 13 (S427).

Specifically, the status monitor UI 12 in S427 in this embodiment detaches the shared memory which has been attached to this process in S415. Incidentally, in cases where the interprocess communication has been implemented in S415 by a method other than the shared memory, the status monitor UI 12 in S427 carries out a different process such as releasing a resource that has been reserved for the interprocess communication.

Subsequently, the status monitor UI 12 deletes the targeted display buffer which has been reserved in the step S417 (S429). Also in the steps S427 and S429, the status monitor UI 12 identifies the parser 13 as the sender of the message (targeted parser 13) based on the message similarly to the step S421. According to the identification, the status monitor UI 12 closes the communication with the identified parser 13 (S427) and deletes the display buffer corresponding to the identified parser 13 (S429).

Subsequently, the status monitor UI 12 judges whether there remains no parser process (process executed by a parser 13) as a monitoring target (S431). When there remains a parser process as a monitoring target (S431: NO), the status monitor UI 12 returns to the step S401. On the other hand, when there remains no parser process as a monitoring target (S431: YES), the status monitor UI 12 ends the message loop process of FIG. 5.

Meanwhile, when the instruction by the message does not specify "uninstallation" in S425 (S425: NO), the status monitor UI 12 executes a process (other process) corresponding to the instruction (S433) and thereafter returns to the step S401.

<Parser Process>

Next, the aforementioned parser process will be explained referring to flow charts of FIGS. 6-10.

Figure 6:
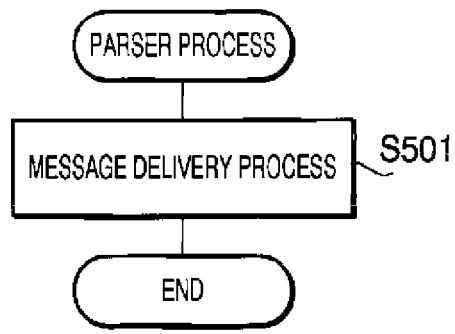
FIG. 6 is a flow chart showing a parser process executed by the PC (parser).

In parallel with the above message loop process of FIG. 5 executed by the status monitor UI 12, the process shown in FIG. 6 (parser process) is executed by the parser 13 which has been activated in the step S303 in FIG. 4.

Specifically, the parser 13 executes a message delivery process (S501) in the parser process of FIG. 6. In the message delivery process of S501, the parser 13 executes a process corresponding to a prescribed condition (one of multiple prescribed processes (including those shown in FIGS. 7-10) corresponding to multiple prescribed conditions) when one of the prescribed conditions is satisfied.

When the condition satisfied is a termination condition, the parser 13 ends the message delivery process of S501. In this case, the whole process shown in FIG. 6 is ended.

When the condition satisfied is a prescribed condition other than the termination condition, the parser 13 executes a process corresponding to the prescribed condition. Thereafter, the parser 13 (continuing the message delivery process of S501) waits until one of the prescribed conditions is satisfied again. When a prescribed condition is satisfied, the parser 13 executes a process corresponding to the prescribed condition.

In other words, the parser 13 in the step S501 repeats the task of executing a process corresponding to a satisfied condition (upon each satisfaction of a prescribed condition other than the termination condition) until the termination condition is satisfied.

In the following, each of the processes of FIGS. 7-10, which is executed in the step S501 in FIG. 6 when each condition is satisfied, will be described.

<Initialization Message Process>

First, an initialization message process shown in FIG. 7 will be explained. The initialization message process is executed when a condition "immediately after the activation of the parser 13" is satisfied.

At the start of the initialization message process, the parser 13 initializes various flags (S601), in which a device attachment/detachment flag, a data request command transmission completion flag and a communication impossibility display flag are set to OFF (initial values) and a communication failure counter is cleared to 0 (initial value).

Subsequently, the parser 13 makes preparations for establishing communication with the status monitor UI 12 (S603), such as reserving a memory area to be used as the shared memory. Subsequently, the parser 13 finds out a port name that is used by the printer based on the printer name which has been passed over to the parser 13 as an argument at the activation of the parser 13 (S605) and loads a lower-level layer program) corresponding to the port name (S607).

The program loaded in the step S607 is a program provided as a DLL (Dynamic Link Library). In S607, an arbitrator 14 corresponding to the port name is loaded into memory by the process functioning as the parser 13. From this point on, the parser 13 can acquire the status information by use of the arbitrator 14 corresponding to the port being used by the targeted printer (printer being handled).

After finishing the above process, the parser 13 sends an installation message to the process of the status monitor UI 12 (S609). The installation message is the message serving as the trigger for the execution of the steps S415 and S417 in the aforementioned message loop process (FIG. 5) executed by the status monitor UI 12.

At the point when the process executed by the status monitor UI 12 receiving the installation message is completed, the communication between the status monitor UI 12 and the parser 13 is established. After finishing the step S609, the parser 13 ends the initialization message process of FIG. 7. Thereafter, the parser 13 waits (in the step S501 of FIG. 6) until a prescribed condition is satisfied again.

<Termination Message Process>

Next, a termination message process shown in FIG. 8 will be explained. The termination message process is executed when a termination condition is satisfied. The termination condition is satisfied and the termination message process is executed when a prescribed termination instruction is inputted by the user by operating the operation unit 8, for example. The termination condition can also be satisfied by other situations, such as the occurrence of an error.

At the start of the termination message process, the parser 13 sends an uninstallation message to the process of the status monitor UI 12 (S701). The uninstallation message is the message serving as the trigger for the execution of the steps S427-S431 in the aforementioned message loop process (FIG. 5) executed by the status monitor UI 12.

Figure 7:
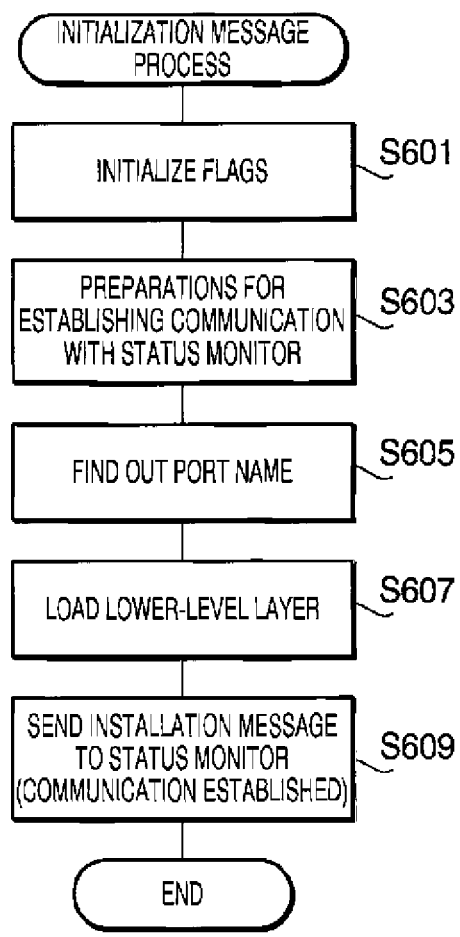
FIG. 7 is a flow chart showing an initialization message process executed by the parser.
Figure 8:
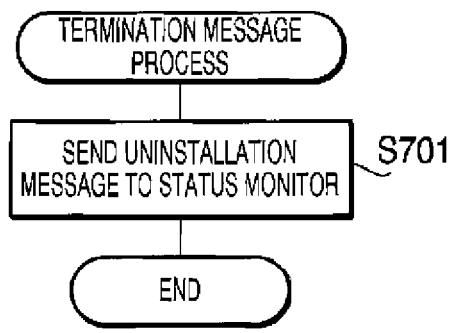
FIG. 8 is a flow chart showing a termination message process executed by the parser.

After finishing the step S701, the parser 13 executes a necessary process (such as releasing the shared memory which has been prepared in S603 in FIG. 7) and thereafter ends the termination message process of FIG. 8, by which the message delivery process (S501) in FIG. 6 is ended.

<Device Configuration Change Message Process>

Figure 9:
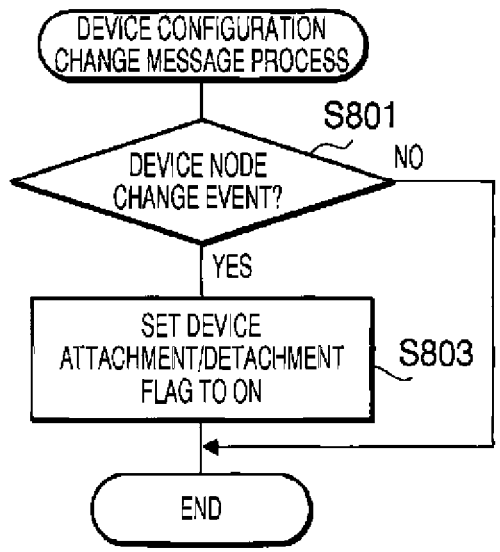
FIG. 9 is a flow chart showing a device configuration change message process executed by the parser.

Next, a device configuration change message process shown in FIG. 9 will be explained. In this embodiment, the message "WM_DEVICECHANGE" is sent from the PnP manager 23 to the parser 13 (see FIG. 1B) when the configuration of devices connected to the PC 1 (device configuration) has changed. This is a function of the OS installed in the PC 1 in this embodiment.

Here, the "change in the device configuration" can include, for example, the switching (from ON to OFF or from OFF to ON) of the power switch of the printer 2A or 2B, the connection/disconnection of a communication cable connecting the PC 1 with the printer 2A or 2B, etc.

The device configuration change message process which will be explained below is executed when a condition "reception of the message "WM_DEVICECHANGE" from the PnP manager 23" is satisfied.

At the start of the device configuration change message process, the parser 13 judges whether the event that has occurred is a device node change event ("DBT_DEVNODES_CHANGED" event) or not (S801).

Specifically, in the case where the message "WM_DEVICECHANGE" is supplied from the PnP manager 23 to the parser 13, some parameters have been attached to the message. Therefore, the parser 13 in the step S801 judges whether a parameter attached to the message is "DBT_DEVNODES_CHANGED" or not. The message "DBT_DEVNODES_CHANGED" means that the new device is attached to or detached from the PC1.

When the event that has occurred is the device node change event ("DBT_DEVNODES_CHANGED" event) (S801: YES), the parser 13 sets the device attachment/detachment flag to ON (S803) and thereafter ends the device configuration change message process of FIG. 9.

On the other hand, when the event that has occurred is not the device node change event ("DBT_DEVNODES_CHANGED" event) (S801: NO), the parser 13 ends the device configuration change message process of FIG. 9 without executing the step S803. Incidentally, the device attachment/detachment flag which has been set to ON in S803 will be referred to in a timer message process (FIG. 10) which will be explained below.

<Timer Message Process>

Next the timer message process shown in FIG. 10 will be explained. The timer message process is executed when a condition that a prescribed time period has passed (since the activation of the parser 13 or the timer message process itself) is satisfied. In short, the timer message process is executed repeatedly at the prescribed time periods. Incidentally, the actual process flow in the timer message process (loop) can change occasionally since the values of the flags, etc. change in the repetition of the loop.

Therefore, the following explanation of the timer message process will be given by assuming various situations when the process is executed and describing each process flow of the timer message process corresponding to each of the assumed situations.

First, the flow of the timer message process in a case where the timer message process is executed for the first time when the communication with the printers 2A and 2B can be executed normally (initial stage) will be described.

At the start of the timer message process, the parser 13 judges whether the device attachment/detachment flag is ON or not (S901). The device attachment/detachment flag can be set to ON in the device configuration change message process (FIG. 9) explained above.

However, in this initial stage, the device attachment/detachment flag in many cases remains at the initial value "OFF" which has been set in the initialization message process (FIG. 7). Thus, the following explanation will be given assuming that the device attachment/detachment flag has been set to OFF. The other case where the device attachment/detachment flag has been set to ON will be explained later separately.

When the device attachment (detachment flag is OFF (S901: NO), the parser 13 judges whether the communication failure counter (indicating the number of communication failures) is less than a prescribed number of times (e.g. 5) or not (S903). While the communication failure counter can be incremented when a communication failure with a printer 2A or 2B occurs in a process explained later, the communication failure counter in the initial stage remains at the initial value "0" which has been set in the initialization message process (FIG. 7).

When the communication failure counter is less than the prescribed number of times (S903: YES), the parser 13 receives data (i.e. status information) from the lower-level layer (i.e. arbitrator 14) (S905). Subsequently, the parser 13 judges whether the communication has failed or not (S907).

Specifically, in the step S905, communications with the printers 2A and 2B are established by conducting negotiations with them and thereafter the status information is received from the printers 2A and 2B. In the step S907, the parser 13 judges that the communication has succeeded (S907: NO) if the communications with the printers 2A and 2B have been established successfully and the reception of the status information has been finished normally. On the other hand, the parser 13 judges that the communication has failed (S907: YES) if the establishment of the communications with the printers 2A and 2B has failed or the reception of the status information has ended abnormally.

In the step S907, the communication is judged to have succeeded (S907: NO) in cases where the power of each printer (2A, 2B) is ON and normal communication with the printers 2A and 2B is possible. In such cases, the parser 13 clears the communication failure counter to 0 (S911) and thereafter judges whether any data (i.e. status information) has been acquired in the step S905 (S913).

The judgment of S913 is made when the communication is judged to have succeeded in S907 (S907: NO). Even when the communication has succeeded (S907: NO), there are cases where no data is acquired. In such cases, the judgment of S913 results in "NO" (S913: NO).

Incidentally, in order to receive data (status information) in the step S905, it is necessary to previously set the printers 2A and 2B in the status information supplying state (in which the supply of the status information is possible) by transmitting a data request command (PJL command) to the printers 2A and 2B.

In the initial stage, however, the step S905 is executed without the transmission of the data request command (PJL command) to the printers 2A and 2B, and thus no data (status information) is supplied from the printers 2A and 2B and the parser 13 necessarily judges that no data has been acquired in the step S905 (S913: NO).

In this case, the parser 13 subsequently judges whether the device attachment/detachment flag is ON or not (S915). Since the device attachment/detachment flag is OFF (S915: NO) in the initial stage according to the above assumption, the parser 13 subsequently judges whether the data request command transmission completion flag is OFF or not (S917).

Since the data request command transmission completion flag in the initial stage remains at the initial value "OFF" which has been set in the initialization message process (FIG. 7), the judgment of S917 results in "YES" (S917: YES). In this case, the parser 13 transmits the command "USTATUS DEVICE ON" as the data request command to the printers 2A and 2B and the INFO command ("INFO STATUS") which will be explained later to this command (S919).

The transmission of the data request command may be carried out by any method as long as the data request command can be transmitted with no problem in consideration of the specifications of each printer receiving the command, the specifications of the printer ports used by the printers, etc.

In this embodiment, the command "USTATUS DEVICE ON" as one of the PJL commands is transmitted as the data request command. For the transmission of PJL commands as various commands transmitted from the PC 1 to the printers 2A and 2B (e.g. the command "USTATUS DEVICE ON" as the data request command in S919), the PC 1 employs the spooler system 21.

In the spooler system 21 of the PC 1, each PJL command is processed as one print job, by which the command "USTATUS DEVICE ON" is transmitted to the printers 2A and 2B in the case of the step S919.

Since the command "USTATUS DEVICE ON" is a command that is transmitted by use of the spooler system 21 as above, the command "USTATUS DEVICE ON" is prevented from being transmitted to the printers 2A and 2B simultaneously with other print jobs.

Figure 10:
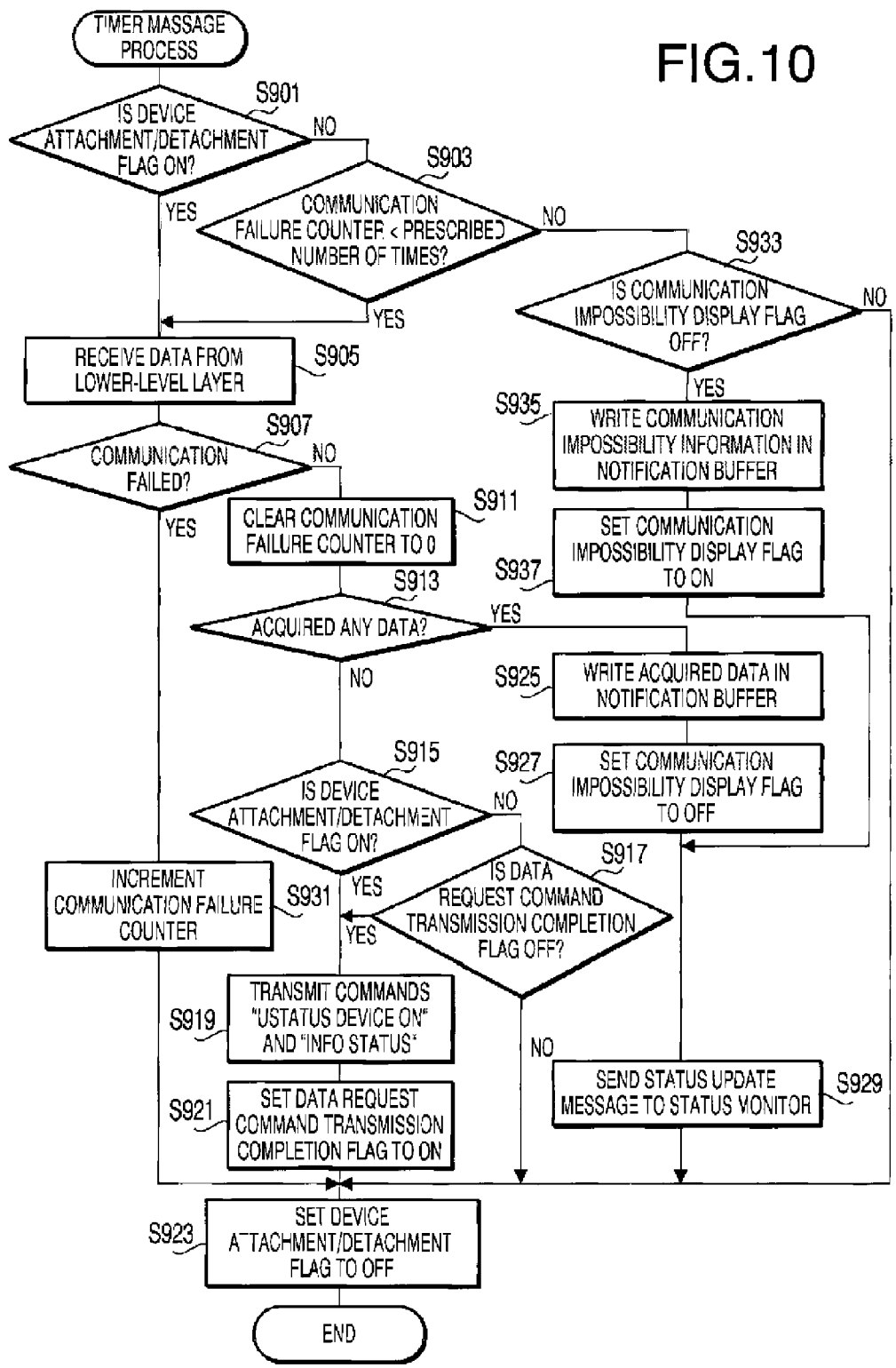
FIG. 10 is a flow chart showing a timer message process executed by the parser.

The parser 13 which has transmitted the above command "USTATUS DEVICE ON" to the printers 2A and 2B sets the data request command transmission completion flag to ON (S921), sets the device attachment/detachment flag to OFF (S923), and ends the timer message process of FIG. 10.

Next, specific flows of the timer message process when the process is executed again in various situations (other than the initial stage) will be described by assuming the various situations.

When the timer message process is executed again (after the aforementioned execution of the timer message process in the initial stage), the parser 13 has already transmitted the command "USTATUS DEVICE ON" and the INFO command ("INFO STATUS") to the printers 2A and 2B in the aforementioned step S919, and thus the parser 13 is capable of receiving data (status information) from the lower-level layer in the step S905.

In this embodiment, the parser 13 has already reserved memory to be used as a reception buffer and turned over the address of the reception buffer (as an argument) to the arbitrator 14 prior to the data reception in S905.

The arbitrator 14 stores data in the address of the reception buffer specified by the parser 13, by which the data is received by the parser 13. In this case, the arbitrator 14 receives the status information from the printers 2A and 2B in a method (format) suitable for the specifications of the class drivers 15A and 15B and stores the received (inputted) status information in the reception buffer.

Even though the arbitrator 14 receives the status information in a method (format) suitable for the specifications of the class drivers 15A and 15B as above, the received (inputted) status information is stored in the reception buffer in a format independent of the specifications of the class drivers 15A and 15B.

With this configuration, the parser 13 is allowed to refer to the status information stored in the reception buffer with no need of considering the specifications of the printer ports.

Whether the parser 13 actually acquires data from the lower-level layer or not varies depending on whether any change has occurred to the status of the printers 2A and 2B or not.

When the parser 13 has acquired data in S905 from the lower-level layer, the parser 13 in the step S913 judges that there exists data (status information) that has been acquired (S913: YES). In this case, the parser 13 writes the acquired data (status information) in a notification buffer which is used for communication with the status monitor UT 12 (S925).

The notification buffer in which the status information is written in S925 is the shared memory which has been reserved in the step S603 in FIG. 7. By the writing of the status information in the shared memory (notification buffer), the status monitor UI 12 is allowed to refer to the latest status information.

Incidentally, the status information stored in the reception buffer in S905 is in a data format that is dependent on (that can vary depending on) the specifications of the printers 2A and 2B. Meanwhile, the parser 13 in the step S925 parses (analyzes the syntax and expressions of) the status information stored in the reception buffer, converts the status information into a prescribed data format, and writes the converted status information in the shared memory (notification buffer).

With this configuration, the status monitor UI 12 is allowed to refer to the status information stored in the shared memory with no need of considering the specifications of the PJL (Printer Job Language).

After finishing the above step S925, the parser 13 sets the communication impossibility display flag to OFF (S927) and sends a status update message to the process of the status monitor UI 12 (S929). The status update message is the message serving as the trigger for the execution of the steps S421 and S423 in the aforementioned message loop process (FIG. 5) executed by the status monitor UI 12.

After finishing the step S929, the parser 13 advances to the aforementioned step S923 and thereafter ends the timer message process of FIG. 10.

On the other hand, when the parser 13 has not acquired data in S905 from the lower-level layer, the parser 13 in the step S913 judges that there exists no data (status information) that has been acquired (S913: NO). In this case, the parser 13 advances to steps S915 and S917.

If the step S921 has already been executed at this point, the data request command transmission completion flag has been set to ON, and thus the judgment of S917 results in "NO" (S917: NO). In this case, the parser 13 advances to the aforementioned step S923 and thereafter ends the timer message process of FIG. 10.

While the process flow of the timer message process when the communication with the printers 2A and 2B can be executed normally is as explained above, there are cases where the normal communication with the printers 2A and 2B becomes impossible.

For example, the normal communication with the printers 2A and 2B can become impossible when the power switch of the printer 2A or 2B is turned OFF, when a communication cable between the PC 1 and the printer 2A or 2B is pulled out from a connector, etc. In such cases, the timer message process is executed in a flow described below.

When the communication failure counter is less than the prescribed number of times (e.g. 5) at the point of execution of the timer message process, the judgment of S903 results in "YES" (S903: YES). In this case, the parser 13 executes the data reception process of S905.

However, since the communication with the printers 2A and 2B can not be executed normally in this example, the parser 13 in the next step S907 judges that the communication has failed (S907: YES). In this case, the parser 13 increments the communication failure counter (S931), advances to the aforementioned step S923, and thereafter ends the timer message process of FIG. 10.

Since the timer message process is executed repeatedly at prescribed time periods as mentioned above, this process flow including the step S931 is repeated while the normal communication with the printers 2A and 2B is impossible, by which the communication failure counter eventually reaches the prescribed number of times (e.g. 5).

When the communication failure counter is not less than the prescribed number of times (e.g. 5) at the point of execution of the timer message process, the judgment of S903 results in "NO" (S903: NO). In this case, the parser 13 judges whether the communication impossibility display flag is OFF or not (S933).

When the communication impossibility display flag is OFF (S933: YES), it means that information that the communication with the printer 2A or 2B is impossible (communication impossibility information) has not been supplied to the status monitor UI 12 yet.

Therefore, the parser 13 in this case writes the communication impossibility information in the notification buffer (S935), sets the communication impossibility display flag to ON (S937), and thereafter advances to the aforementioned step S929.

In the step S929, the status update message is sent from the parser 13 to the process of the status monitor UI 12. Subsequently, the parser 13 advances to the aforementioned step S923 and thereafter ends the timer message process of FIG. 10.

On the other hand, when the communication impossibility display flag is not OFF in S933 (S933: NO), it means that the communication impossibility information (information that the communication with the printer 2A or 2B is impossible) has already been supplied to the status monitor UI 12.

Therefore, the parser 13 in this case directly advances to the step S923 (without further supplying the communication impossibility information to the status monitor UI 12) and thereafter ends the timer message process of FIG. 10.

Incidentally, even when the communication with the printer 2A or 2B has become impossible, the device configuration change message "WM_DEVICECHANGE" can occur and the device attachment/detachment flag can be turned ON according to the device configuration change message.

In this case (S901: YES), the data reception process of S905 is executed even when the communication failure counter is not less than the prescribed number of times (S903: NO). However, the data reception process is executed just once and there is substantially no ill effect since the device attachment/detachment flag is turned OFF again in S923.

While the process flow of the timer message process when the communication with the printers 2A and 2B can not be executed normally is as explained above, there are cases where the normal communication with the printers 2A and 2B becomes possible again.

For example, the normal communication with the printers 2A and 2B can become possible again when the power switch of the printer 2A or 2B is turned. ON again, when a communication cable between the PC 1 and the printer 2A or 2B is inserted into a connector again, etc.

In such cases, the aforementioned device configuration change message process (FIG. 9) is executed and the device attachment/detachment flag is turned ON, by which the timer message process of FIG. 10 is executed in a flow described below.

First, the parser 13 in S901 judges that the device attachment/detachment flag is ON (S901: YES) and thereby advances directly to the data reception process of S905 while skipping S903.

In other words, when the device attachment/detachment flag has been turned ON, the data reception process of S905 is executed (similarly to the case where the communication failure counter is less than the prescribed number of times) irrespective of whether the communication failure counter is less than the prescribed number of times or not.

In this case, the steps S905 and S907 are executed, and if the communication is judged to have succeeded in S907 (S907: NO), the communication failure counter is cleared to 0 in S911 even when the communication failure counter has become not less than the prescribed number of times.

In the case where the power switch of the printer 2A or 2B is turned ON again, the printer 2A or 2B does not shift to the status information supplying state unless the command "USTATUS DEVICE ON" is transmitted to the printer 2A or 2B again.

Thus, even if the communication is judged to have succeeded in S907 (S907: NO), the parser 13 in the step S913 judges that no data (status information) has been acquired (S913: NO). However, the judgment of S915 results in "YES" (S915: YES) since the device attachment/detachment flag has been turned ON at this point.

Consequently, the parser 13 advances to the step S919 and transmits the command "USTATUS DEVICE ON" and the PJL INFO command ("INFO STATUS") to the printers 2A and 2B. Thereafter, the printers 2A and 2B remain in the status information supplying state.

Meanwhile, in the case where a plug of a communication cable between the PC 1 and the printer 2A or 2B (remaining ON) has been pulled out and thereafter plugged in, both the printers 2A and 2B are still remaining in the status information supplying state (in which the printers are capable of returning the status information). However, the UI (User Interface) of the PC 1 might be indicating "information that the communication with a printer is impossible" at this point.

In such cases, even if there is no status change in the printers, the current information can be acquired from each printer by use of the PJL INFO command ("INFO STATUS"). Upon reception of the current information, the status information is updated to the normal status information via the steps S913, S925 and S927.

Incidentally, while a PJL command can be transmitted to the printers 2A and 2B in this embodiment upon satisfaction of a prescribed condition even when a device other than the printers 2A and 2B is disconnected and connected, there is no ill effect since the printers 2A and 2B remain in the same state even if the printers receive the command "USTATUS DEVICE ON" more than once.

Further, while the current information is returned from the printers each time (in response to each INFO command) even when there is no status change in the printers, there is no problem since the UI of the PC 1 keeps on displaying the same status information.

<Power Management-Related Message Process>

Next, a power management-related message process shown in FIG. 11 will be described. The power management-related message process is executed by the parser 13 when a condition that a message relating to power management (sent from the OS for the shift from the normal operating state (first state) to the power-saving state (second state), the return from the power-saving state to the normal operating state, etc.) is received by the parser 13 is satisfied.

At the start of the power management-related message process, the parser 13 judges whether or not the message from the OS is an inquiry message inquiring whether to shift to the suspend/hibernation state (i.e. the second state) (S1001).

When the message is the inquiry message inquiring whether to shift to the suspend/hibernation state (S1001: YES), the parser 13 transmits the PJL command "USTATUS DEVICE OFF" to the printers 2A and 2B (S1003).

The PJL command "USTATUS DEVICE OFF" is a command for canceling the PJL command "USTATUS DEVICE ON" which has been transmitted in S919 in FIG. 10.

The command "USTATUS DEVICE OFF" is transmitted to the printers 2A and 2B via the spooler system 21. After the transmission, the parser 13 judges whether the transmission of the command "USTATUS DEVICE OFF" to the printers 2A and 2B has been completed or not (S1004).

The judgment of S1004 is made based on whether or not data is remaining in the spooler system 21. When the transmission of the command "USTATUS DEVICE OFF" has not been completed (S1004: NO), the parser 13 judges whether or not one second has passed since the start of the transmission of the command "USTATUS DEVICE OFF" (S1005).

When one second has not passed (S1005: NO), the parser 13 returns to the step S1004. When one second has passed (S1005: YES) or when the transmission of the command "USTATUS DEVICE OFF" has been completed (S1004: YES), the parser 13 replies with the affirmative reply code (permitting the shift to the suspend/hibernation state) to the OS as the response to the inquiry message inquiring whether to shift to the suspend/hibernation state (S1006) and thereafter ends the power management-related message process of FIG. 11.

As above, the affirmative reply code permitting the shift to the suspend/hibernation state is sent to the OS even when one second has passed without the completion of the transmission of the command "USTATUS DEVICE OFF". This procedure is employed so that the shift to the suspend/hibernation state will not be blocked by the parser's not responding to the inquiry message (inquiring whether to shift to the suspend/hibernation state) for a long time.

Conversely, since the affirmative reply code permitting the shift to the suspend/hibernation state is sent to the OS after waiting for the completion of the transmission of the command "USTATUS DEVICE OFF" for at least one second, an unduly early shift to the suspend/hibernation state (with incomplete transmission of the command "USTATUS DEVICE OFF" even though the command can be transmitted normally) can be prevented.

The printers 2A and 2B receiving the command "USTATUS DEVICE OFF" end the status information supplying process.

On the other hand, when the message from the OS is not the inquiry message inquiring whether to shift to the suspend/hibernation state in S1001 (S1001: NO), the parser 13 judges whether or not the message is a suspend/hibernation inquiry cancellation message (S1007). The suspend/hibernation inquiry cancellation message is issued when another application returns a negative reply code in response to the inquiring message.

When the message is the suspend/hibernation inquiry cancellation message (S1007: YES), the parser 13 transmits the PJL command "USTATUS DEVICE ON" to the printers 2A and 2B (S1008) and thereafter ends the power management-related message process of FIG. 11. In this case, the printers 2A and 2B receiving the PJL command "USTATUS DEVICE ON" start the status information supplying process.

On the other hand, when the message is not the suspend/hibernation inquiry cancellation message (S1007: NO), the parser 13 judges whether or not the message is a notification message indicating that the PC 1 shifts to the suspend/hibernation state (S1009).

When the message is the notification message indicating the shift to the suspend/hibernation state (S1009: YES), the parser 13 directly ends the power management-related message process of FIG. 11.

On the other hand, when the message is not the notification message indicating the shift to the suspend/hibernation state (S1009: NO), the parser 13 judges whether or not the message is a notification message indicating the return from the suspend/hibernation state (S1011).

When the message is the notification message indicating the return from the suspend/hibernation state (S1011: YES), the parser 13 judges whether or not a printer (2A, 2B) is ON (S1013).

When a printer (2A, 2B) is ON (S1013: YES), the parser 13 transmits NULL data to the printer (S1015). This step S1015 is executed in order to cancel the so-called sleep state of the printer.

When the NULL data is received by a printer (2A, 2B) that has been in the sleep state, the printer (2A, 2B) starts operating, that is, the sleep state of the printer is canceled. It should be noted that, when the NULL data is received, the printing process is not executed.

Subsequently, the parser 13 transmits the PJL command "USTATUS DEVICE ON" and "INFO STATUS" (S1017) and thereafter ends the power management-related message process of FIG. 11. In this case, each printer (2A, 2B) receiving the PJL command "USTATUS DEVICE ON" and "INFO STATUS" starts the status information supplying process.

Incidentally, the judgment of S1013 on whether a printer (2A, 2B) is ON or not is made based on whether a device ID can be acquired from a printer as a target of judgment. This method is employed in S1013 since the device ID can be acquired from each printer relatively quickly and reliably when the power of the printer is ON and the judgment that a printer is OFF can be made immediately when the device ID can not be acquired from the printer.

When the device ID can be acquired from no printer, that is, when no printer is judged to be ON (S1013: NO), the transmission of the PJL commands is not executed. Therefore, no error message (due to impossibility of transmission from the spooler system 21) is displayed by the PC 1.

Even in this case, the commands "USTATUS DEVICE ON" and "INFO STATUS" are transmitted in the aforementioned step S919 (see FIG. 10) at the point when the power of a printer is turned ON, by which the parser 13 can thereafter acquire the status information successively.

In the case where no printer is ON in S1013 (S1013: NO), the parser 13 executes a status monitor termination process (S1019). In the status monitor termination process (S1019), necessary steps such as the transmission of the uninstallation message are executed similarly to the termination message process of FIG. 8. Then, the parser 13 ends the power management-related message process of FIG. 11.

<Specific Examples of Shifts Between First State and Second State>

Figure 11:
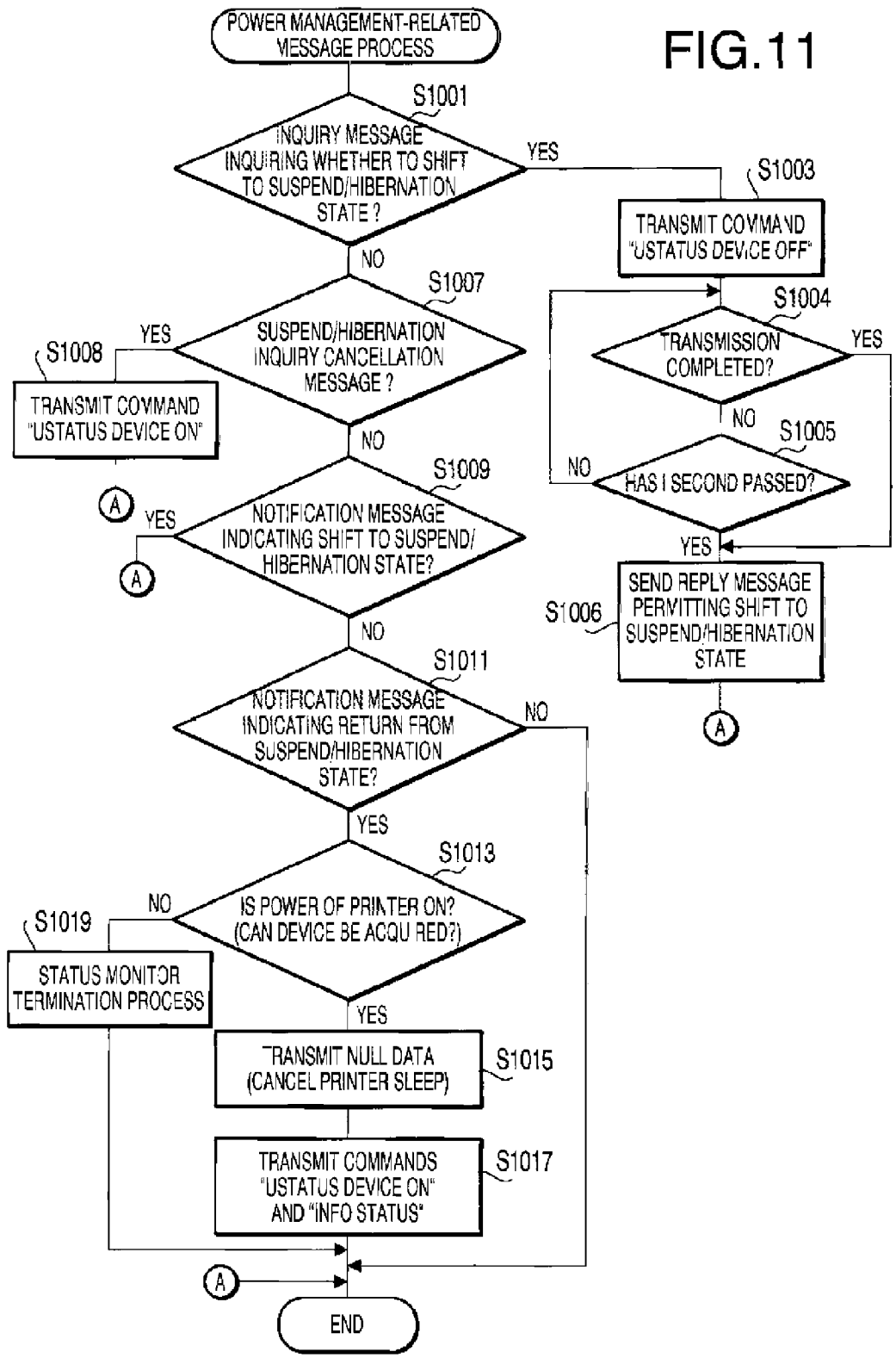
FIG. 11 is a flow chart showing a power management-related message process executed by the parser.

The power management-related message process of FIG. 11 described above is executed when the PC 1 shifts from the first state (normal operating state) to the second state (power-saving state) or returns from the second state (power-saving state) to the first state (normal operating state) in response to a prescribed user operation, for example.

However, how the process flow branches in the power management-related message process of FIG. 11 varies depending on the specific situation. Therefore, the behavior of the PC 1 executing the power management-related message process in various situations will be explained more concretely with reference to timing charts of FIGS. 12-14.

Incidentally, in the timing charts (FIGS. 12-14) to be referred to in the following explanation, the whole processing application providing the status monitor function will be indicated simply as "STATUS MONITOR" for simple description of the timing charts. The processing application providing the status monitor function is actually formed by the aforementioned processes of the status monitor UI 12, the parser 13, etc.

Figure 12:
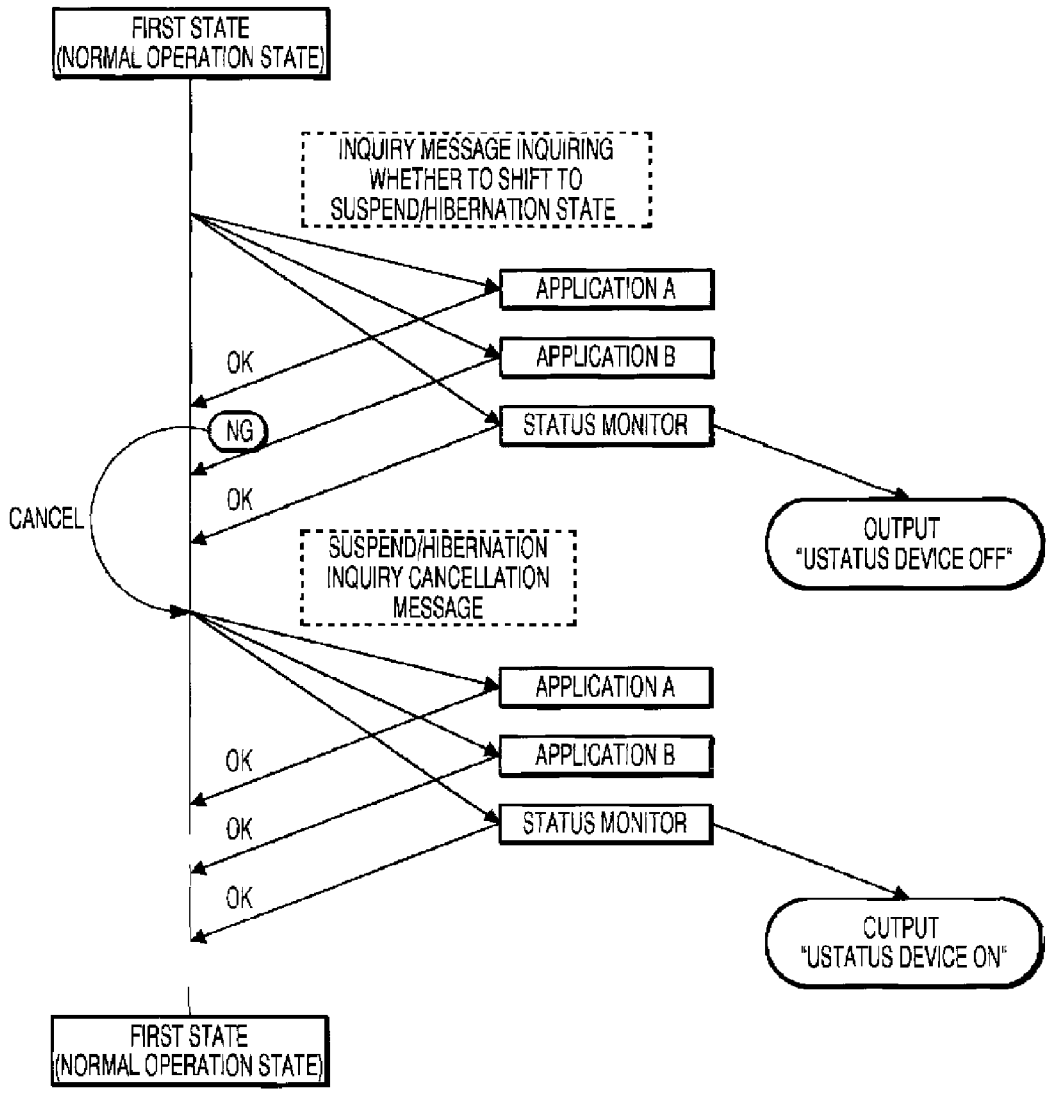
FIG. 12 is a timing chart showing a case where the shift of the PC from the first state to the second state is canceled.
Figure 13:
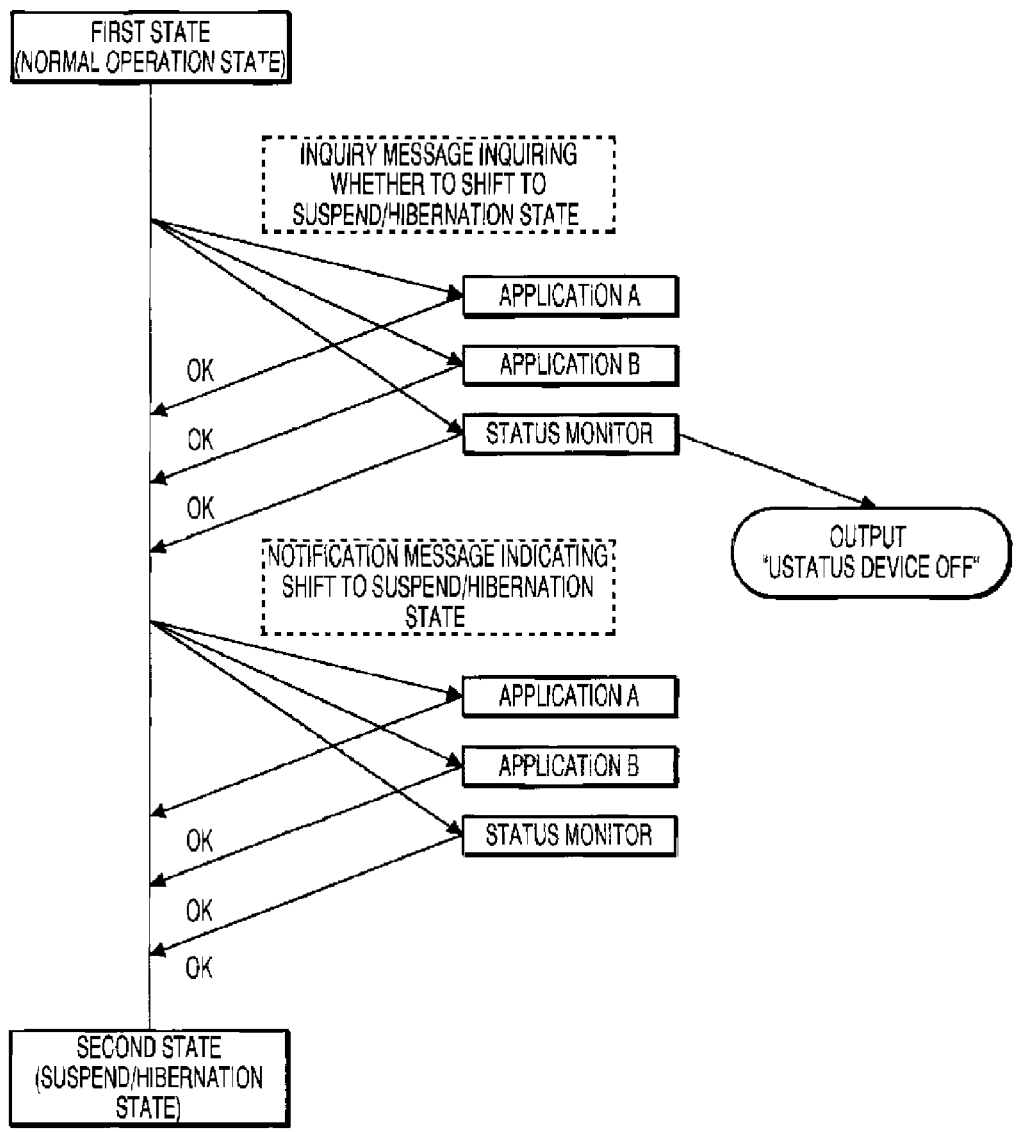
FIG. 13 is a timing chart showing a case where the PC shifts from the first state to the second state.
Figure 14:
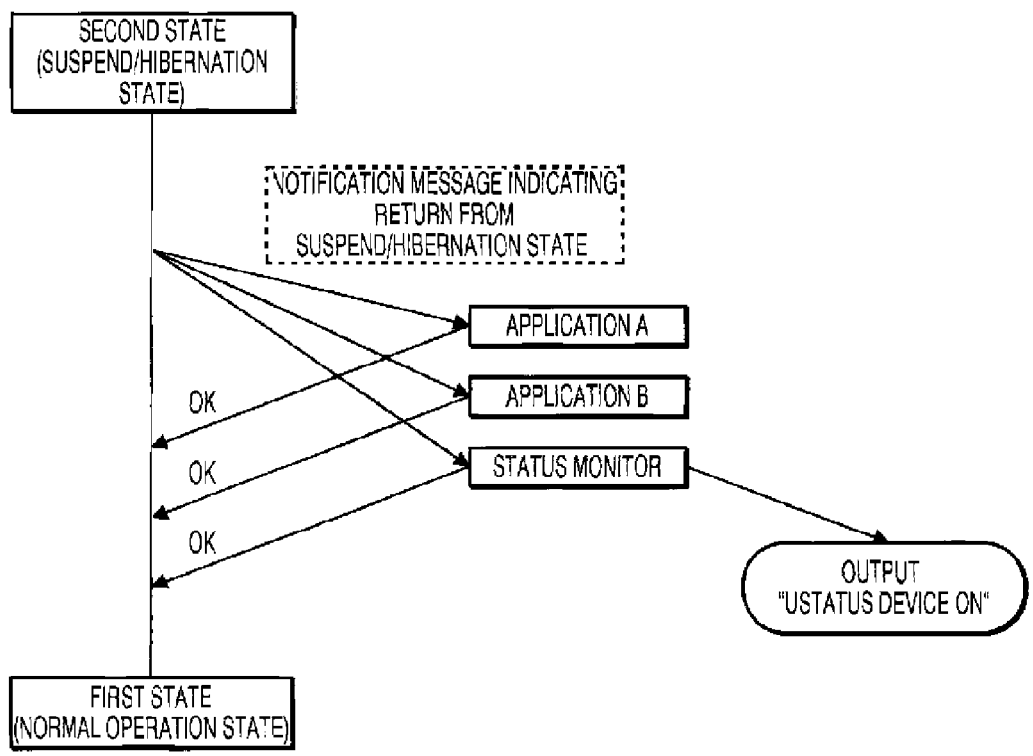
FIG. 14 is a timing chart showing a case where the PC returns from the second state to the first state.

While applications A and B are shown in FIGS. 12-14 as examples of software other than the status monitor, each of the applications A and B may also be configured as a single process or a processing application made up of multiple processes cooperating with one another.

<Example of Cancellation of Shift from First State to Second State>

First, a specific example in which the shift from the first state to second state is canceled will be described referring to FIG. 12.

When a prescribed operation is performed by the user to instruct the PC 1 in the first state (normal operating state) to shift to the second state (power-saving state), the OS of the PC 1 sends a message to all processing applications operating on the PC 1 as shown in FIG. 12.

The message sent by the OS in this case is the aforementioned inquiry message inquiring whether to shift to the suspend/hibernation state. This message is delivered to processing applications such as the status monitor, the application A and the application B, for example.

When the inquiry message is received by the status monitor, for example, the power management-related message process of FIG. 11 is executed upon reception of the message, in which the judgment of S1001 results in "YES" and the step S1003 is executed. In this case where the command "USTATUS DEVICE OFF" is transmitted in S1003, the status information supplying process is ended by the printers 2A and 2B.

In this case of the status monitor, the step S1004 for checking whether the data transmission by the spooler system 21 has been completed or not is executed after the step S1003. Thereafter, the step S1006 for returning the affirmative reply code (permitting the shift to the suspend/hibernation state) to the OS is executed.

Meanwhile, each of other processing applications having no problem even if the PC 1 shifts to the suspend/hibernation state (e.g. application A) also returns a similar affirmative reply code (permitting the shift to the suspend/hibernation state) to the OS.

However, there can be a processing application having a problem with the shift of the OS to the suspend/hibernation state (e.g. application B). In this case, such a processing application returns a negative reply code (rejecting the shift to the suspend/hibernation state) to the OS.

In such cases, the OS recognizing that there exists a processing application returning the negative reply code (rejecting the shift to the suspend/hibernation state) determines that the shift to the suspend/hibernation state should be canceled, and sends another message to all processing applications operating on the PC 1.

The message sent by the OS in this case is the aforementioned suspend/hibernation inquiry cancellation message. This message is also delivered to processing applications such as the status monitor, the application A and the application B, for example.

When the suspend/hibernation inquiry cancellation message is received by the status monitor, for example, the power management-related message process of FIG. 11 is executed upon reception of the message, in which the judgment of S1007 results in "YES" and the step S1008 is executed. In this case where the command "USTATUS DEVICE ON" is transmitted in S1008, the status information supplying process is started by the printers 2A and 2B.

After finishing the step S1008, the status monitor returns an affirmative reply code (permitting the cancellation of the shift to the suspend/hibernation state) to the OS.

Meanwhile, each of other processing applications having no problem with the cancellation of the shift to the suspend/hibernation state (e.g. applications A and B) also returns a similar affirmative reply code to the OS.

Consequently, the shift to the suspend/hibernation state is canceled and the PC 1 thereafter keeps on operating in the first state.

<Example of Shift from First State to Second State>

Next, a specific example of the shift from the first state to the second state will be described referring to FIG. 13.

When a prescribed operation is performed by the user to instruct the PC 1 in the first state to shift to the second state, the OS of the PC 1 sends a message to all processing applications operating on the PC 1 as shown in FIG. 13.

The message sent by the OS in this case is the aforementioned inquiry message inquiring whether to shift to the suspend/hibernation state. This message is delivered to processing applications such as the status monitor, the application A and the application B, for example.

When the inquiry message is received by the status monitor, for example, the power management-related message process of FIG. 11 is executed upon reception of the message, in which the judgment of S1001 results in "YES" and the step S1003 is executed. In this case where the command "USTATUS DEVICE OFF" is transmitted in S1003, the status information supplying process is ended by the printers 2A and 2B.

In this case of the status monitor, the step S1004 for checking whether the data transmission by the spooler system 21 has been completed or not is executed after the step S1003, and thereafter the step S1006 for returning the affirmative reply code (permitting the shift to the suspend/hibernation state) to the OS is executed.

Meanwhile, each of other processing applications having no problem with the shift to the suspend/hibernation state (e.g. applications A, B) also returns a similar affirmative reply code (permitting the shift to the suspend/hibernation state) to the OS.

In such cases where no processing application returns a negative reply code (rejecting the shift to the suspend/hibernation state), the OS determines that the PC 1 should shift to the suspend/hibernation state and sends another message to all processing applications operating on the PC 1.

The message sent by the OS in this case is the aforementioned notification message indicating that the PC 1 shifts to the suspend/hibernation state. This message is also delivered to processing applications such as the status monitor, the application A and the application B, for example.

When the inquiry message is received by the status monitor, for example, the power management-related message process of FIG. 11 is executed upon reception of the message, in which the judgment of S1009 results in "YES".

In this case, the status monitor returns an affirmative reply code (permitting the shift to the suspend/hibernation state) to the OS. Meanwhile, each of other processing applications having no problem with the shift to the suspend/hibernation state (e.g. applications A, B) also returns a similar affirmative reply code to the OS.

Consequently, the PC 1 shifts to the second state under proper control of each component of the PC 1 by the OS.

<Example of Return from Second State to First State>

Next, a specific example of the return from the second state to the first state will be described referring to FIG. 14.

When a prescribed operation is performed by the user to instruct the PC 1 in the second state to return to the first state, the OS of the PC 1 makes all the processing applications (that had been operating on the PC 1 before the shift to the second state) restart their operations, and sends a message to each processing application.

The message sent by the OS in this case is the aforementioned notification message indicating the return from the suspend/hibernation state. This message is delivered to processing applications such as the status monitor, the application A and the application B, for example.

When the notification message (indicating the return from the suspend/hibernation state) is received by the status monitor, for example, the power management-related message process of FIG. 11 is executed upon reception of the message, in which the judgment of S1011 results in "YES" and the routine of S1013-S1019 is executed. In cases where the step S1017 (transmission of the commands "USTATUS DEVICE ON" and "INFO STATUS") is executed in the routine of S1013-S1019, the status information supplying process is started by the printers 2A and 2B.

After finishing the routine of S1013-S1019, the status monitor returns an affirmative reply code (indicating that there is no problem with the return from the suspend/hibernation state) to the OS. Meanwhile, each of other processing applications having no problem with the return from the suspend/hibernation state (e.g. applications A, B) also returns a similar affirmative reply code to the OS. Consequently, the PC 1 returns to the first state.

As described above, the PC 1 in the above embodiment having the status monitor function transmits the PJL commands "USTATUS DEVICE ON" and "INFO STATUS" (start signal) to the printers 2A and 2B (S1017) at the point when the PC 1 has returned from the second state to the first state.

Therefore, even when the status of a printer 2A or 2B has been initialized (by the turning OFF and ON of the power of the printer, for example) during the second state of the PC 1, the PC 1 is capable of restarting the process of acquiring the status information from the printers 2A and 2B and displaying the acquired status information with no problem.

Further, the PC 1 carries out the transmission of the PJL command "USTATUS DEVICE ON" and "INFO STATUS" (start signal) in S1017 after confirming that the communication with the printers 2A and 2B is possible in S1013, by which the start signal can be transmitted to the printers 2A and 2B without fail.

In cases where the PC 1 finds that communication with no printer (2A, 2B) is possible in S1013 (S1013: NO), the status monitor (which can be regarded to be unnecessary) is ended in S1019, by which resources for the status monitor can be released and the processing load on the PC 1 can be reduced.

When the PC 1 shifts from the first state to the second state, the PC 1 instructs the printers 2A and 2B to end the status information supplying process by transmitting the PJL command "USTATUS DEVICE OFF" in S1003, by which the printers 2A and 2B are relieved of the need of executing unnecessary processes and the processing loads on the printers 2A and 2B can be reduced.

The PC 1 transmits a termination signal (i.e. the PJL command "USTATUS DEVICE OFF" which is transmitted in S1003) to the printers 2A and 2B at the stage when the inquiry message inquiring whether to shift to the second state or not is issued from the OS (S1001: YES). Therefore, the transmission of the termination signal can be started before each component of the PC 1 actually shifts from the first state to the second state. As a result, a condition where lots of pieces of status data are accumulated in the printer as the status of the printer changes although the PC 1 shifted into the second state cannot acquire status data from the printer can be prevented.

Further, the PC 1 (parser 13) sends the affirmative reply code permitting the shift to the second state to the OS in response to the inquiry message from the OS (S1006) after confirming that the termination signal has already been transmitted from the spooler system 21. Therefore, the PC 1 is capable of shifting from the first state to the second state after securely carrying out the transmission of the termination signal.

Specifically, the affirmative reply code permitting the shift to the second state is sent to the OS even when a prescribed time period (e.g. 1 second) has passed without the completion of the transmission of the termination signal. With this procedure, the shift to the second state is prevented from being blocked by the parser's not responding to the inquiry message (inquiring whether to shift to the second state) for a long time.

Conversely, since the affirmative reply code permitting the shift to the second state is sent to the OS after waiting for the completion of the transmission of the termination signal for at least the prescribed time period, an unduly early shift to the second state (with incomplete transmission of the termination signal even though the termination signal can be transmitted normally) can be prevented.

Furthermore, the PC 1 (parser 13) cancels the sleep state of the printers 2A and 2B prior to actual printing by the printers (S1015) when the PC 1 returns from the second state to the first state. Therefore, each printer (2A, 2B) can thereafter be used immediately when the printer becomes necessary for printing.

<Modifications>

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the PC 1 in the above embodiment is configured to transmit the termination signal to the printers 2A and 2B when it shifts from the first state to the second state while transmitting the start signal to the printers 2A and 2B when it returns from the second state to the first state, other configurations are also possible.

Specifically, even if the PC 1 is configured to transmit no termination signal at the shift from the first state to the second state, the PC 1 can securely acquire the status information from the printers 2A and 2B when it returns from the second state to the first state if the PC 1 is just equipped with a unit for transmitting the start signal at the return from the second state to the first state. Thus, considerable effect can be achieved even with this simplified configuration.

As another example for reference, when it is just necessary to reduce the processing loads on the printers 2A and 2B, considerable effect can be achieved by just equipping the PC 1 with a unit for transmitting the termination signal at the shift from the first state to the second state.

While the PC 1 in the above embodiment transmits the start signal at the return from the second state to the first state after confirming that a printer is ON, the PC 1 may also be configured to transmit the start signal unconditionally in cases where the transmission of the start signal while the power of the printers is OFF does not have a particular problem.

Specifically, the start signal may be transmitted unconditionally if no error occurs (i.e. if the start signal is just not received by the printers 2A and 2B) even when the power of the printers 2A and 2B is OFF at the point when the start signal is transmitted to the printers.

While the PC 1 in the above embodiment is configured to end the status monitor when the power of the printers is OFF at the return from the second state to the first state, other configurations are also possible. For example, the PC 1 may also be configured so that the status monitor stays resident on the PC 1 irrespective of whether the printers are ON or OFF and waits (or keeps monitoring the printers) until the power of a printer is turned ON next.

Further, the invention need not be limited to a device that displays the status information, but the device that may record a log of the status information. That is, as far as the device is one for monitoring the status information, the present invention can be applied.

What is claimed is:

1. A non-transitory computer-readable record medium storing computer-readable instructions that cause an information processing device, configured to be capable of shifting from a first state as a normal operating state to a second state as a state for reducing power consumption compared to the first state and returning from the second state to the first state, to function as a status monitor for monitoring status of an image formation device on a display unit by causing the information processing device to function as:
    a first detection unit configured to detect return of the information processing device from the second state to the first state by detecting a notification message from an operating system of the information processing device, the notification message indicating the return of the information processing device from the second state to the first state;
    a start signal transmission unit configured to transmit a start signal to the image formation device when the return of the information processing device to the first state from the second state is detected by the first detection unit, wherein the start signal is configured to cause the image formation device to, when the image formation device receives the start signal from the information processing device, shift to a state in which the image formation device is configured to supply status information indicating a status of the image formation device;
    an acquisition unit configured to acquire the status information from the image formation device which has received the start signal; and
    a monitor processing unit configured to execute processing for monitoring the status of the image formation device on the display unit based on the status information acquired by the acquisition unit,
    wherein the image formation device and the information processing device are physically distinct from one another.

2. The non-transitory computer-readable record medium according to claim 1, further storing computer-readable instructions that cause the information processing device to function as a judgment unit which judges whether communication with the image formation device is possible or not, wherein:
    the start signal transmission unit transmits the start signal on condition that the communication is judged to be possible by the judgment unit after detecting the return of the information processing device from the second state to the first state.

3. The non-transitory computer-readable record medium according to claim 2, further storing computer-readable instructions that cause the information processing device to function as a control unit which ends or interrupts a process for making the information processing device function as the status monitor when the communication is judged to be impossible by the judgment unit.

4. The non-transitory computer-readable record medium according to claim 1, further storing computer-readable instructions that cause the information processing device to function as:
    a second detection unit which detects that the information processing device shifts from the first state to the second state; and
    a termination signal transmission unit which transmits a termination signal, for requesting the image formation device to end the supply of the status information, to the image formation device when the shift to the second state is detected by the second detection unit.

5. The non-transitory computer-readable record medium according to claim 4,
    wherein the information processing device is configured to make an inquiry as to whether or not the information processing device may shift from the first state to the second state, make a notification that the information processing device shifts from the first state to the second state when there is no reply rejecting the shift to the second state in response to the inquiry, and thereafter shift from the first state to the second state, and
    wherein the second detection unit functions as a unit which determines the inquiry as to whether or not the information processing device may shift from the first state to the second state.

6. The non-transitory computer-readable record medium according to claim 5,
wherein the computer-readable instructions cause the information processing device to function as a third detection unit which detects cancellation of the inquiry, and wherein the start signal transmitting unit transmits the start signal when the third detection unit detects the cancellation.

7. The non-transitory computer-readable record medium according to claim 5, further storing computer-readable instructions that cause the information processing device to function as:
a judgment unit which judges whether or not the termination signal has already been transmitted to by the termination signal transmission unit; and
a reply unit which makes a reply permitting the shift to the second state in response to the inquiry when the judgment unit judges that the termination signal has already been transmitted.

8. The non-transitory computer-readable record medium according to claim 7,
wherein the judgment unit includes:
a completion judgment unit which judges whether or not the transmission of the termination signal by the termination signal transmission unit has already been completed; and
a timeout judgment unit which judges whether or not a prescribed time period has passed since the termination signal transmission unit started the transmission of the termination signal, and
wherein the reply unit makes the reply permitting the shift to the second state in response to the inquiry when the completion judgment unit judges that the transmission of the termination signal by the termination signal transmission unit has already been completed or the timeout judgment unit judges that the prescribed time period has passed since the termination signal transmission unit started the transmission of the termination signal.

9. The non-transitory computer-readable record medium according to claim 1, further storing computer-readable instructions that cause the information processing device to function as a cancellation signal transmission unit which transmits a signal for canceling a sleep state of the image formation device to the image formation device when the return to the first state is detected by the first detection unit.

10. The non-transitory computer readable medium of claim 1, wherein the start signal transmission unit is configured to transmit the start signal to the image formation device through a wired or wireless connection.

11. The non-transitory computer readable medium of claim 1, wherein the start signal transmission unit is further configured to transmit the start signal to the image formation device when a status monitor is activated on the information processing device.

12. An information processing device configured to be capable of shifting from a first state as a normal operating state to a second state as a state for reducing power consumption compared to the first state and returning from the second state to the first state, comprising:
at least one processor; and
memory operatively coupled to the at least one processor and storing computer readable instructions that, when executed, cause the information processing device to provide:
a first detection unit configured to detect the return of the information processing device from the second state to the first state by detecting a notification message from an operating system of the information processing device, the notification message indicating the return of the information processing device from the second state to the first state;
a start signal transmission unit configured to transmit a start signal to an image formation device when the return of the information processing device to the first state from the second state is detected by the first detection unit, wherein the start signal is configured to cause the image formation device to, when the image formation device receives the start signal from the information processing device, shift to a state in which the image formation device is configured to supply status information indicating a status of the image formation device;
an acquisition unit configured to acquire the status information from the image formation device receiving the start signal; and
a monitor processing unit configured to execute processing for monitoring the status of the image formation device on a display unit based on the status information acquired by the acquisition unit,
wherein the image formation device and the information processing device are physically distinct from one another.

13. The information processing device of claim 12, wherein the start signal transmission unit is further configured to transmit the start signal to the image formation device when a status monitor is activated on the information processing device.

14. The information processing device according to claim 12, wherein the memory further stores computer-readable instructions that cause the information processing device to provide:
a judgment unit configured to judge whether communication with the image formation device is possible or not, wherein the start signal transmission unit transmits the start signal on condition that the communication is judged to be possible by the judgment unit after detecting the return of the information processing device from the second state to the first state; and
a control unit configured to end or interrupt a process for making the information processing device function as the status monitor when the communication is judged to be impossible by the judgment unit.

15. A method for an information processing device, configured to be capable of shifting from a first state as a normal operating state to a second state as a state for reducing power consumption compared to the first state and returning from the second state to the first state, to display status of an image formation device on a display unit, comprising:
a first detection step of detecting the return of the information processing device from the second state to the first state, wherein detecting the return of the information processing device includes detecting a notification message from an operating system of the information processing device, the notification message indicating the return of the information processing device from the second state to the first state;
a transmission step of transmitting a start signal to the image formation device when the return to the first state is detected in the first detection step, wherein the start signal is configured to cause the image formation device to, when the image formation device receives the start signal from the information processing device, shift to a state in which the image formation device is configured to supply status information indicating a status of the image formation device, wherein the image formation device and the information processing device are physically distinct from one another;

an acquisition step of acquiring the status information from the image formation device receiving the start signal; and a monitor processing step of executing processing for monitoring the status of the image formation device on the display unit based on the status information acquired by the acquisition step.

16. The method of claim 15, wherein the transmission step further comprises transmitting the start signal to the image formation device when a status monitor is activated on the information processing device.

17. The method according to claim 15, further comprising:
judging whether communication with the image formation device is possible or not, wherein the transmission step is performed on condition that the communication is judged to be possible after detecting the return of the information processing device from the second state to the first state; and ending or interrupting a process for making the information processing device function as the status monitor when the communication is judged to be impossible.

18. A non-transitory computer-readable record medium storing computer-readable instructions that cause an information processing device, configured to be capable of shifting from a first state as a normal operating state to a second state as a state for reducing power consumption compared to the first state and returning from the second state to the first state, to function as a status monitor for monitoring status of an image formation device on a display unit by causing a computer of the information processing device to function as:

a start signal transmission unit configured to transmit a start signal to the image formation device when the status monitor is activated on the information processing device, wherein the start signal is configured to cause the image formation device to shift to a state in which the image formation device is configured to supply status information indicating a state of the image formation device;

an acquisition unit configured to acquire the status information from the image formation device which has received the start signal;

a monitor processing unit configured to execute processing for monitoring the status of the image formation device on the display unit based on the status information acquired by the acquisition unit;

a detection unit configured to detect return of the information processing device from the second state to the first state by detecting a notification message from an operating system of the information processing device, the notification message indicating the return of the information processing device from the second state to the first state; and a start signal re-transmission unit configured to re-transmit the start signal to the image formation device when the return of the information processing device to the first state from the second state is detected by the detection unit.

19. The non-transitory computer record medium of claim 18, further storing computer-readable instructions that cause the information processing device to function as:

a judgment unit configured to judge whether communication with the image formation device is possible or not, wherein the start signal re-transmission unit re-transmits the start signal on condition that the communication is judged to be possible by the judgment unit after detecting the return of the information processing device from the second state to the first state; and a control unit configured to end or interrupt a process for making the information processing device function as the status monitor when the communication is judged to be impossible by the judgment unit.

* * * * *